US012315446B2

(12) United States Patent
Son et al.

(10) Patent No.: US 12,315,446 B2
(45) Date of Patent: May 27, 2025

(54) PIXEL CIRCUIT AND DISPLAY PANEL INCLUDING THE SAME

(71) Applicant: LG Display Co., Ltd., Seoul (KR)

(72) Inventors: Ki Min Son, Paju-si (KR); Chang Hee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 18 days.

(21) Appl. No.: 18/477,396

(22) Filed: Sep. 28, 2023

(65) Prior Publication Data

US 2024/0169919 A1 May 23, 2024

(30) Foreign Application Priority Data

Nov. 23, 2022 (KR) ........................ 10-2022-0158067

(51) Int. Cl.
*G09G 3/3233* (2016.01)

(52) U.S. Cl.
CPC ... *G09G 3/3233* (2013.01); *G09G 2300/0443* (2013.01)

(58) Field of Classification Search
CPC ..................... G09G 3/3233; G09G 2300/0443
See application file for complete search history.

(56) References Cited

U.S. PATENT DOCUMENTS

2016/0064411 A1* 3/2016 Park ..................... H10D 86/441 257/89
2018/0102092 A1* 4/2018 Kubota ................ G09G 3/3233
2022/0366847 A1* 11/2022 An ....................... G09G 3/2003

FOREIGN PATENT DOCUMENTS

KR 10-2012-0009904 A 2/2012
KR 10-2016-0033616 A 3/2016
KR 10-2020-0043058 A 4/2020

* cited by examiner

*Primary Examiner* — Peter D McLoone
(74) *Attorney, Agent, or Firm* — Seed IP Law Group LLP

(57) ABSTRACT

A pixel circuit and a display panel including the same are disclosed. The display panel includes: an individual switch element configured to supply a pixel driving voltage to a first sub-pixel in response to a gate signal; and a shared switch element configured to supply the pixel driving voltage to second and third sub-pixels in response to the gate signal. Each of the individual switch element and the shared switch element is a transistor having a channel width. The channel width of the shared switch element is larger than the channel width of the individual switch element.

14 Claims, 13 Drawing Sheets

PIXEL CIRCUIT AND DISPLAY PANEL INCLUDING THE SAME

CROSS-REFERENCE TO RELATED APPLICATION

This application claims priority to and the benefit of Korean Patent Application No. 10-2022-0158067, filed Nov. 23, 2022, the disclosure of which is incorporated herein by reference in its entirety.

BACKGROUND

Technical Field

The present disclosure relates to a pixel circuit and a display panel including the same.

Description of Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

In an electroluminescent display device, the efficiency of light emitting elements may be different for each color and the current required for driving them may be different. When a pixel driving voltage is named 'EVDD' and a cathode voltage is named 'EVSS,' power consumption of the electroluminescent display device is determined by (EVDD−EVSS)×panel current. Here, 'panel current' is the total amount of current flowing through all pixels in the display panel. A circuit layer of the display panel includes wires and transistors. The larger an IR drop generated by current (I) and resistance (R) within the wires and the transistors, the higher the pixel driving voltage EVDD is required, which increases the power consumption.

BRIEF SUMMARY

The present disclosure provides a pixel circuit capable of reducing power consumption, and a display panel including the pixel circuit.

The problems or limitations to be solved or addressed by the present disclosure are not limited to those mentioned herein, and other problems or limitations not mentioned will be clearly understood by those skilled in the art from the following description.

A pixel circuit according to an embodiment of the present disclosure includes: a first driving element including a first electrode connected to a first-first node, a gate electrode connected to a first-second node, and a second electrode connected to a first-third node; a first light emitting element configured to be driven by a current from the first driving element; a first-first switch element configured to apply a pixel driving voltage to the first-first node in response to a first gate signal, the first-first switch element having a channel width; a second driving element including a first electrode connected to a second-first node, a gate electrode connected to a second-second node, and a second electrode connected to a second-third node; a second light emitting element configured to be driven by a current from the second driving element; a third driving element including a first electrode connected to a third-first node, a gate electrode connected to a third-second node, and a second electrode connected to a third-third node; a third light emitting element configured to be driven by a current from the third driving element; and a second-first switch element configured to apply the pixel driving voltage to the second-first node and the third-first node in response to the first gate signal, the second-first switch element having a channel width. The channel width of the second-first switch element is larger than the channel width of the first-first switch element.

A display panel according to an embodiment of the present disclosure includes: an individual switch element configured to supply a pixel driving voltage to a first sub-pixel in response to a gate signal; and a shared switch element configured to supply the pixel driving voltage to second and third sub-pixels in response to the gate signal. Each of the individual switch element and the shared switch element is a transistor having a channel width. The channel width of the shared switch element is larger than the channel width of the individual switch element. Each of the sub-pixels includes the pixel circuit.

According to the present disclosure, it is possible to reduce the IR drop of the switch elements to supply the pixel driving voltage to the driving elements.

According to the present disclosure, the pixel circuits of the second and third sub-pixels may be disposed in a left-right symmetric structure or a flip structure, thereby maximizing the channel width of the shared switch element without increasing the size of the pixel circuits.

According to the present disclosure, the overall load of the pixels may be reduced by designing a small channel width of the individual switch element connected to one sub-pixel and a large channel width of the shared switch element connected to two sub-pixels.

According to the present disclosure, the power consumption of the display device may be improved to enhance the reliability of the switch elements, by reducing the IR drop of the switch elements supplying the pixel driving voltage to the first to third sub-pixels.

Effects which can be achieved by the present disclosure are not limited to the above-mentioned effects. That is, other technical features, benefits, or effects that are not mentioned may be obviously understood by those skilled in the art to which the present disclosure pertains from the following description and are included in the scope of the disclosure.

BRIEF DESCRIPTION OF THE SEVERAL VIEWS OF THE DRAWINGS

The above and other technical effects, features, and advantages of the present disclosure will become more apparent to those of ordinary skill in the art by describing example embodiments thereof in detail with reference to the attached drawings, in which.

DETAILED DESCRIPTION

Figure 1:
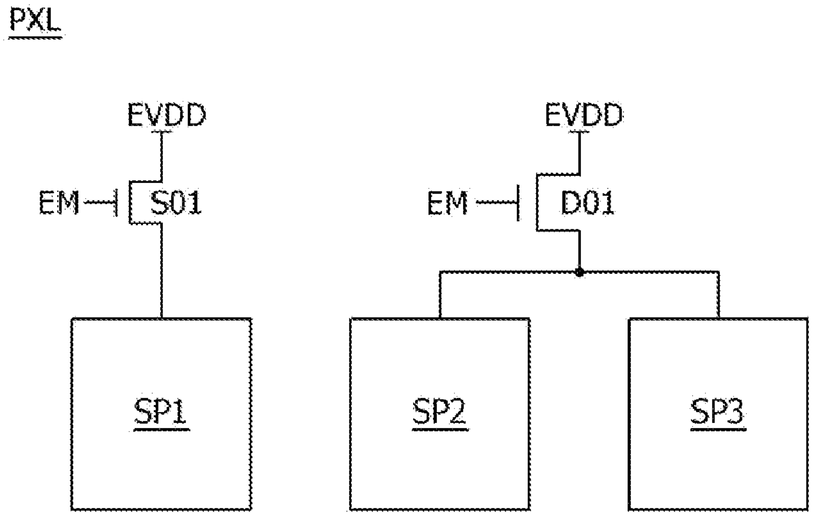
FIG. 1 is a diagram schematically illustrating sub-pixels to which a shared switch element is connected according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after," "following," "next to," "before," or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels includes a plurality of sub-pixels having different colors for color implementation. Each of the sub-pixels includes a pixel circuit including a switch element and a driving element to drive a light emitting element. The switch element and the driving element are implemented with transistors of a thin film transistor (TFT) structure.

A driving circuit of the display device writes pixel data of an input image into pixels. The driving circuit includes a data driver for supplying data signals to data lines, and a gate driver for supplying gate signals to gate lines.

In the display device, a pixel circuit of each of the sub-pixels includes a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT. Hereinafter, transistors of the pixel circuit will be described based on the n-channel oxide TFT implemented with an oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of the n-channel transistor, the gate-on voltage may be a gate high voltage (VGH), and the gate-off voltage may be a gate low voltage (VGL).

The present disclosure is not intended to be limited by the names of components or signals in the description of the embodiments.

Referring to FIG. 1, a pixel PXL according to an embodiment of the present disclosure includes at least three sub-pixels SP1, SP2, and SP3 having different colors. A first sub-pixel SP1, a second sub-pixel SP2, and a third sub-pixel SP3 generate light having different peak wavelengths.

Each of the first to third sub-pixels SP1, SP2, and SP3 includes a pixel circuit to drive a light emitting element. The pixel circuits of the first to third sub-pixels SP1, SP2, and SP3 are connected to data lines, gate lines, and power lines.

Each of the first to third sub-pixels SP1, SP2, and SP3 includes switch elements S01 and D01 that switch a pixel driving voltage EVDD in response to an emission control signal EM.

An individual switch element S01 switches the pixel driving voltage EVDD supplied to the first sub-pixel SP1 in response to the emission control signal EM. A shared switch element D01 is connected in common to the second and third sub-pixels SP2 and SP3. The shared switch element D01 switches the pixel driving voltage EVDD supplied to the second and third sub-pixels SP2 and SP3 in response to the emission control signal EM.

When the pixel PXL generates white light at maximum brightness, the maximum current flows in each of a red sub-pixel, a green sub-pixel, and a blue sub-pixel. In this case, more current may flow in each of the green and blue sub-pixels than in the red sub-pixel.

Figure 2:
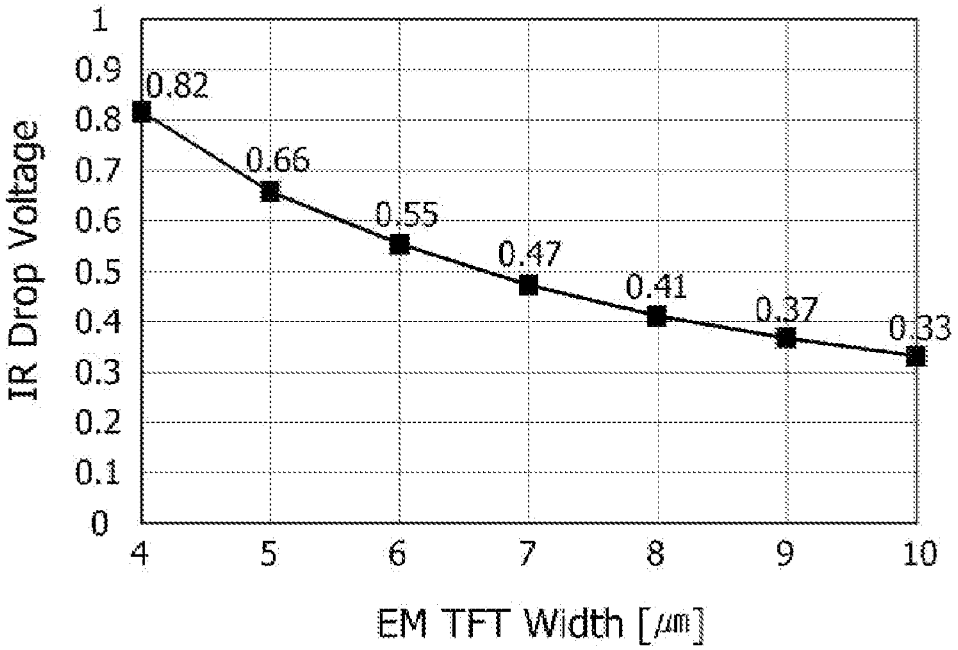
FIG. 2 is a graph illustrating an IR drop voltage according to a change in channel width of an EMTFT.

The switch elements S01 and D01 may be implemented as a TFT of the same channel type, for example, an n-channel oxide TFT. The channel width W of the shared switch element D01 is larger than that of the switch element S01 of the first sub-pixel SP1. According to the experimental results, as shown in FIG. 2, an amount of IR drop of an EM TFT becomes smaller as the channel width W of the EM TFT becomes larger. The channel of the switch elements S01 and D01 is a semiconductor channel that overlaps their gate electrodes and allow carriers to flow between them and their drain electrodes. In FIG. 2, the abscissa is the channel width [μm] of the EM TFT, and the ordinate is the IR drop voltage [V] as the channel width [μm] of the EM TFT changes. The EM TFT is the switch elements S01 and D01. The channel width W of the shared switch element D01 is preferably designed to be 2 to 4 times larger than that of the individual switch element S01, considering the current ratio flowing in the red, green, and blue sub-pixels.

In an embodiment, the second and third sub-pixels SP2, SP3 sharing the shared switch element D01 may be sub-pixels driven by a larger current than the first sub-pixel SP1. For example, the second sub-pixel SP2 may be a green sub-pixel and the third sub-pixel SP3 may be a blue sub-pixel. In this case, the first sub-pixel SP1 may be a red sub-pixel. Therefore, when the sub-pixels SP2 and SP3 with relatively large current amounts are connected to the shared switch element D01, the amount of IR drop in the sub-pixels SP2 and SP3 may be reduced, thereby lowering the pixel driving voltage EVDD. The lower the pixel driving voltage EVDD, the lower the power consumption. Since the individual switch element S01 has a small channel width and the shared switch element D01 has a large channel width, the overall load on the pixel PXL may be reduced.

In another embodiment, one of the second and third sub-pixels SP2 and SP3, which share the shared switch element D01, may be the sub-pixel with the smallest driving current among the sub-pixels SP1, SP2, and SP3 in the pixel PXL, and the other may be the sub-pixel with the largest driving current. For example, the second sub-pixel SP2 may be a red sub-pixel with the smallest driving current, and the third sub-pixel SP3 may be a blue sub-pixel with the largest driving current. The blue sub-pixel has a large IR drop because it is driven by a large current. The red sub-pixel is driven by a relatively low current, so its IR drop is relatively small. The first sub-pixel SP1 may be a green sub-pixel. The driving current of the green sub-pixel may be larger than the red sub-pixel and smaller than the blue sub-pixel. In this embodiment, sub-pixels with large differences in current amounts may lower the pixel driving voltage EVDD by sharing a large channel width of the shared switch element D01. Voltage drop Vdrop across the shared switch element D01 is represented as $Vdrop=R*(I_{sp2}+I_{sp3})$. Where R is an internal resistance of the shared switch element D01. Isp2 is a current flowing in the second sub-pixel SP2, and Isp3 is a current flowing in the third sub-pixel SP3.

Figure 3A:
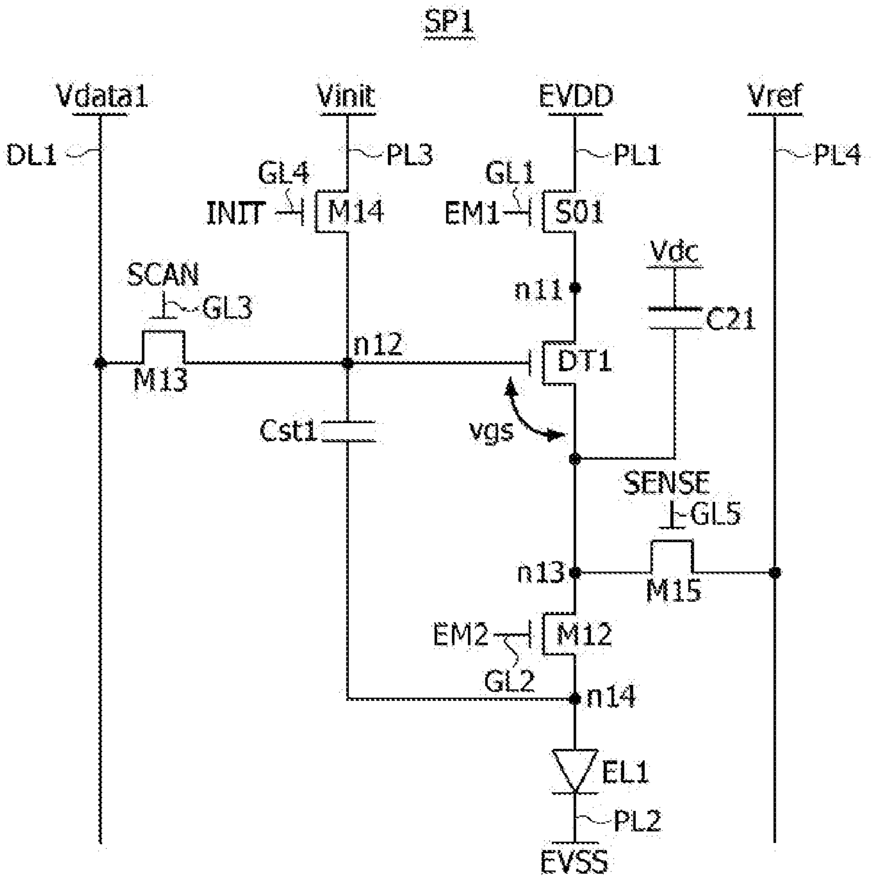
FIGS. 3A and 3B are circuit diagrams illustrating sub-pixels according to a first embodiment of the present disclosure.
Figure 3B:
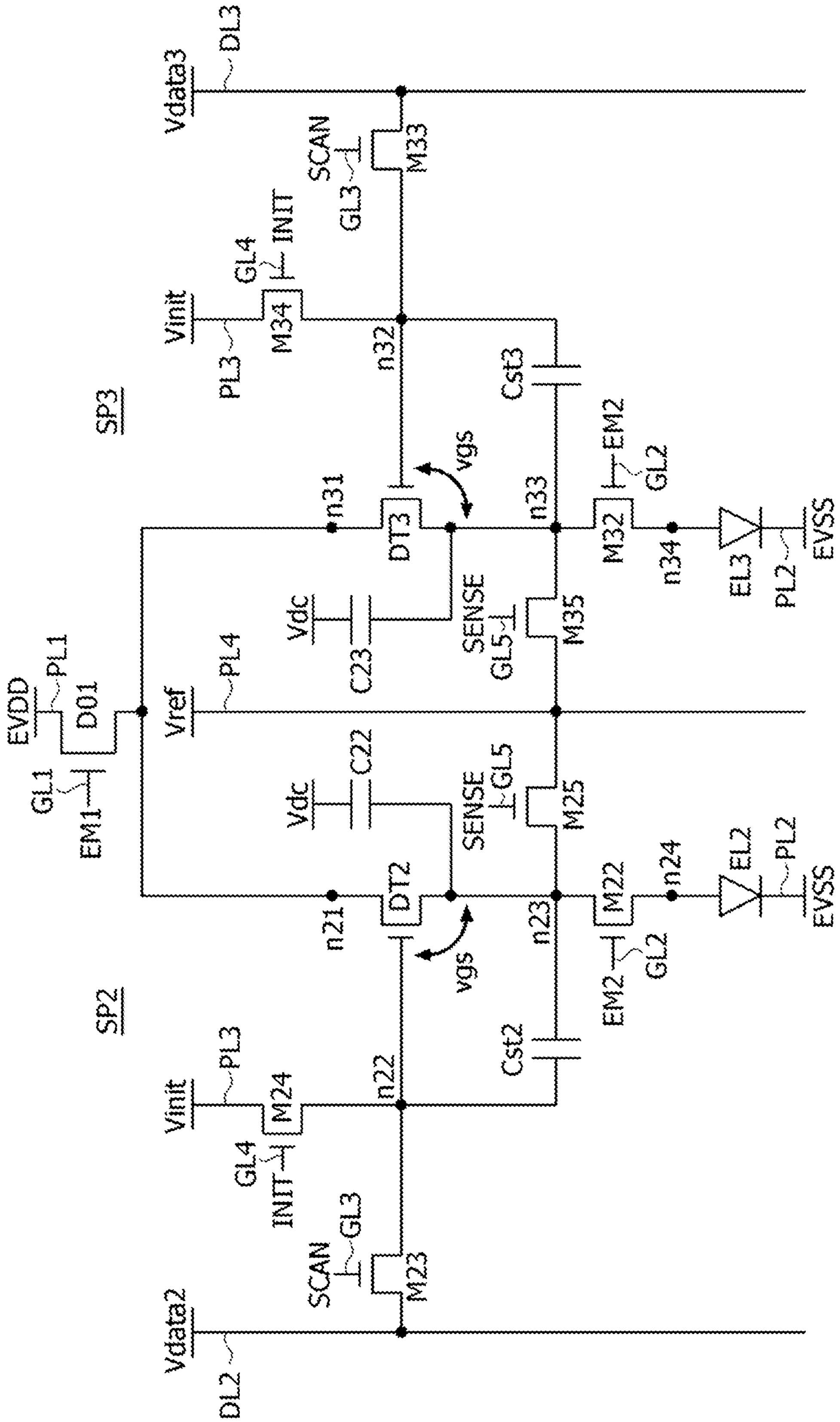
Figure 4:
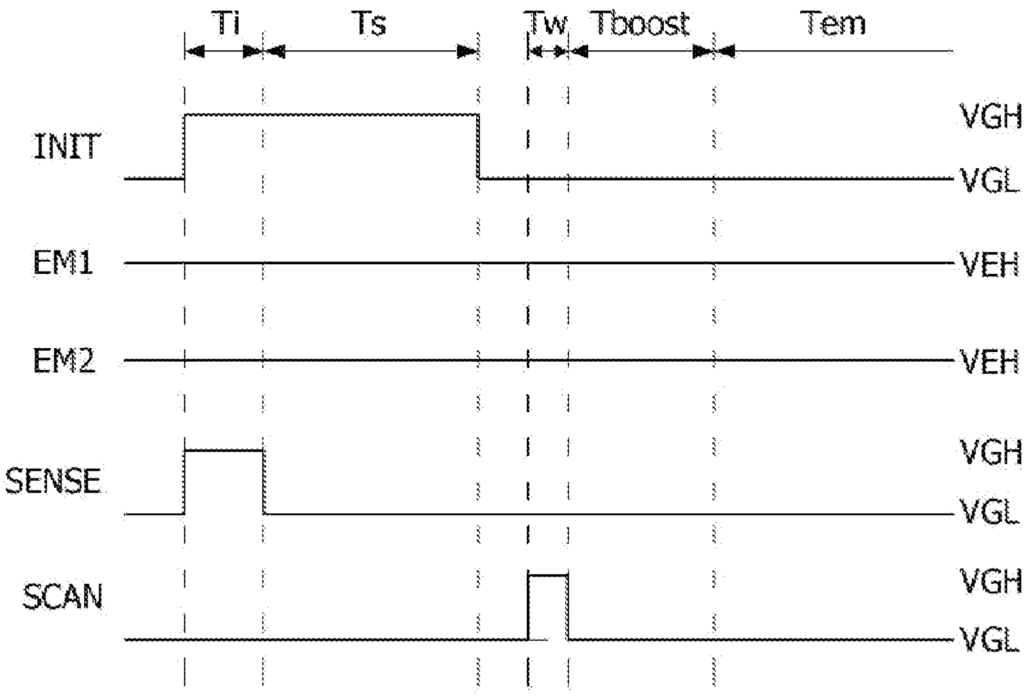
FIG. 4 is a waveform diagram illustrating a gate signal applied to the sub-pixels shown in FIGS. 3A and 3B.

FIGS. 3A and 3B are circuit diagrams illustrating sub-pixels according to a first embodiment of the present disclosure. FIG. 3A is a circuit diagram illustrating a pixel circuit of the first sub-pixel SP1. FIG. 3B is a circuit diagram illustrating a pixel circuit of the second and third sub-pixels SP2 and SP3. FIG. 4 is a waveform diagram illustrating gate signals applied to the sub-pixels SP1, SP2, and SP3 shown in FIGS. 3A and 3B.

Referring to FIGS. 3A to 4, the first sub-pixel SP1 includes a first light emitting element EL1, a first driving element DT1 to drive the first light emitting element EL1, a plurality of switch elements S01, M12 to M15, a first-first capacitor Cst1, and a first-second capacitor C21. The second sub-pixel SP2 includes a second light emitting element EL2, a second driving element DT2 to drive the second light emitting element EL2, a plurality of switch elements D01, M22 to M25, a second-first capacitor Cst2, and a second-second capacitor C22. The third sub-pixel SP3 includes a third light emitting element EL3, a third driving element DT3 to drive the third light emitting element EL3, a plurality of switch elements D01, M32 to M35, a third-first capacitor Cst3, and a third-second capacitor C23. The driving elements DT1, DT2, and DT3 and the switch elements S01, M12 to M15, D01, M22 to M25, and M32 to M35 may be implemented as n-channel oxide TFTs.

The sub-pixels SP1, SP2, and SP3 are connected to a first power line PL1 to which a pixel driving voltage EVDD is applied, a second power line PL2 to which a cathode voltage EVSS is applied, a third power line PL3 to which an initialization voltage Vinit is applied, a fourth power line PL4 to which a reference voltage Vref is applied, a data lines DL1, DL2, and DL3 to which data voltages Vdata1, Vdata2 and Vdata3 are applied, and gate lines GL1 to GL5 to which gate signals EM1, EM2, SCAN, INIT, and SENSE are applied.

The constant voltages EVDD, EVSS, Vinit, and Vref applied to the sub-pixels SP1, SP2, and SP3 include a voltage margin for the operation in a saturation region of the driving element DT (DT1, DT2, DT3 shown). The constant voltages EVDD, EVSS, Vinit, and Vref applied to the sub-pixels SP1, SP2, and SP3 may be set as, but not limited to, EVDD>Vinit>Vref>EVSS, or EVDD>Vinit>EVSS>Vref.

The gate signals EM1, EM2, SCAN, INIT, and SENSE include pulses that swing between a gate-on voltage VGH and a gate-off voltage VGL. The gate signals EM1, EM2, SCAN, INIT, and SENSE include a pulse of a first gate signal EM1, a pulse of a second gate signal EM2, a pulse of a third gate signal SCAN, a pulse of a fourth gate signal INIT, and a pulse of a fifth gate signal SENSE.

A first-first switch element S01 connected to the first sub-pixel SP1 and a second-first switch element D01 connected in common to the second and third sub-pixels SP2 and SP3 are turned on/off in response to the pulse of the first gate signal EM1. The first-first switch element S01 corresponds to the individual switch element shown in FIG. 1, and the second-first switch element D01 corresponds to the shared switch element shown in FIG. 1.

The sub-pixels SP1, SP2, and SP3 may be driven in an initialization step Ti, a sensing step Ts, a data writing step Tw, a boosting step Tboost, and a light emitting step Tem, as illustrated in FIG. 4. In the initialization step Ti, the pixel circuit is initialized. In the sensing step Ts, threshold voltages Vth of the driving elements DT1, DT2, and DT3 are sensed and stored in the first capacitors Cst1, Cst2, and Cst3. In the data writing step Tw, the data voltages Vdata1, Vdata2, and Vdata3 of the pixel data are applied to second nodes n12, n22, and n32. The voltages of the second and third nodes n12, n22, n32, n13, n23, and n33 are increased in the boosting step Tboost, and then the light emitting elements EL1, EL2, and EL3 may be emitted at luminance corresponding to gray scale values of the pixel data in the light emitting step Tem.

The data writing step Tw may be set to approximately one horizontal period. The initialization step Ti may be set to a duration greater than the data writing step Tw so that the pixels can be stably initialized. The sensing step Ts may be set to a duration greater than the initialization step Ti. The emission step Tem is the remaining duration after subtracting the initialization step Ti, the sensing step Ts, the data writing step Tw, and the boosting step Tboost from one frame period.

In the initialization step Ti, the voltages of the first gate signal EM1, the second gate signal EM2, the fourth gate signal INIT, and the fifth gate signal SENSE are the gate-on voltages VEH and VGH, and the voltage of the third gate signal SCAN is the gate-off voltage VGL. Therefore, in the initialization step Ti, the first-first, first-second, first-fourth, and first-fifth switch elements S01, M12, M14, and M15 of the first sub-pixel SP1 and the first driving element DT1 are turned on, while the first-third switch element M13 is turned off. At this time, the initialization voltage Vinit is applied to the first-second node n12, and the reference voltage Vref is applied to the first-third nodes n13. At the same time, the pixel driving voltage EVDD is applied to the first-first node n11.

In the initialization step Ti, the second-first, second-second, second-fourth, second-fifth, third-second, third-fourth, and third-fifth switch elements D01, M22, M24, M25, M32, M34, and M35 of the second and third sub-pixels SP2 and SP3 and the driving elements DT2 and DT3 are turned on, while the second-third and third-third switch elements M23 and M33 are turned off. In this case, the initialization voltage Vinit is applied to the second-second and third-second nodes n22 and n32 and the reference voltage Vref is applied to the second-third and third-third nodes n23 and n33. At the same time, the pixel driving voltage EVDD is applied to the second-first and third-first nodes n21 and n31.

In the sensing step Ts, the voltages of the first, second, and fourth gate signals EM1, EM2, and INIT are the gate-on voltages VEH and VGH, and the voltage of the third gate signal SCAN is the gate-off voltage VGL. In the sensing step Ts, the fifth gate signal SENSE is inverted to the gate-off voltage VGL. In the sensing step Ts, the first-first, first-second, and first-fourth switch elements S01, M12, and M14 of the first sub-pixel SP1 are turned on, while the first-third and first-fifth switch elements M13 and M15 are turned off. The first driving element DT1 is turned off when the voltage of the first-third node n13 rises and its gate-source voltage Vgs reaches a threshold voltage Vth, and the threshold voltage Vth is stored in a first-first capacitor Cst1.

In the sensing step Ts, the second-first, second-second, second-fourth, third-second, and third-fourth switch elements D01, M22, M24, M32, and M34 of the second and third sub-pixels SP2 and SP3 are turned on, while the second-third, second-fifth, third-third and third-fifth switch elements M23, M25, M33, and M35 are turned off. The second driving element DT2 is turned off when the voltage of the second-third node n23 rises and its gate-source voltage Vgs reaches a threshold voltage Vth, and the threshold voltage Vth is stored in the second-first capacitor Cst2. The third driving element DT3 is turned off when the voltage of the third-third node n33 rises and its gate-source voltage Vgs reaches a threshold voltage Vth, and the threshold voltage Vth is stored in the third-first capacitor Cst3.

In the data writing step Tw, the pulse of the third gate signal SCAN synchronized with the data voltage Vdata of the pixel data is generated as the gate-on voltage VGH. The fourth and fifth gate signals INIT and SENSE are generated as the gate-off voltage VGL in the data writing step Tw. When the first gate signal EM1 is the gate-on voltage VEH in the data writing step Tw, the voltage of the third nodes n13, n23, and n33 may be changed according to the mobility of the driving elements DT1, DT2 and DT3, thereby compensating for a variation or deviation in the mobility of the driving elements DT1, DT2 and DT3. For example, if the mobility 'μ' of the driving elements DT1, DT2, and DT3 is large within the data writing step Tw, the voltages of the third nodes n13, n23, and n33 are increased, resulting in the decrease of the gate-source voltage Vgs of the driving elements DT1, DT2, and DT3. On the other hand, when the mobility of the driving elements DT1, DT2, and DT3 is relatively small, the voltages of the third nodes n13, n23, and n33 are decreased, resulting in the increase of the gate-source voltages Vgs of the driving elements DT1, DT2 and DT3.

In the data writing step Tw, the first-first, first-second, and first-third switch elements S01, M12, and M13 of the first sub-pixel SP1 are turned on, while the first-fourth and first-fifth switch elements M14 and M15 are turned off. In the data writing step Tw, the second-first, second-second, second-third, third-second, and third-third switch elements D01, M22, M23, M32, and M33 of the second and third sub-pixels SP2 and SP3 are turned on, while the second-fourth, second-fifth, third-fourth, and third-fifth switch elements M24, M25, M34, and M35 are turned off.

In the boosting step Tboost and the light emission step Tem, the voltages of the first and second gate signals EM1 and EM2 are the gate-on voltage VEH, and the voltages of the other gate signals SCAN, INIT, and SENSE are the gate-off voltage VGL. In the light emission step Tem, the first and second switch elements S01 and M12 of the first sub-pixel SP1 are turned on, while the remaining switch elements M13, M14, and M15 are turned off. In the light emission step Tem, the second-first, second-second, and third-second switch elements D01, M22, and M32 of the second and third sub-pixels SP2 and SP3 are turned on, while the remaining switch elements M23, M24, M25, M33, M34, and M35 are turned off. In the light emission step Tem, the sub-pixels SP1, SP2, and SP3 operate as a source follower circuit to supply current to the light emitting elements EL1, EL2, and EL3 according to the gate-source voltage Vgs of the driving element DT. At this time, the light emitting elements EL1, EL2, and EL3 may be emitted at a luminance corresponding to the gray value of the pixel data. To improve the low gray scale expressiveness, the voltages of the first and second gate signals EM1 and EM2 may swing between the gate-on voltage VEH and the gate-off voltage VEL according to the duty ratio set by the predetermined pulse width modulation (PWM) in the light emission step Tem.

The light emitting elements EL1, EL2, and EL3 may be implemented with an OLED. The OLED includes an organic compound layer formed between an anode electrode and a cathode electrode. The organic compound layer may include, but is not limited to, a hole injection layer (HIL), a hole transport layer (HTL), an emission layer (EML), an electron transport layer (ETL), and an electron injection layer (EIL). An anode electrode of the light emitting element EL1, EL1 and EL3 is connected to a fourth node n14, n24, and n34 and a cathode electrode thereof is connected to the second power line PL2 to which the low-potential power supply voltage EVSS is applied. When a voltage is applied to the anode electrode and the cathode electrode of the light emitting elements EL1, EL2, and EL3, holes that have passed through the hole transport layer (HTL) and electrons that have passed through the electron transport layer (ETL) are transferred to the light emission layer (EML) to form excitons, and visible light is emitted from the light emission layer (EML). The OLED utilized as the light emitting elements EL1, EL2, and EL3 may be tandem structures in which a plurality of light emitting layers are stacked on top of each other. The OLED having the tandem structure may improve the luminance and lifespan of pixels.

The driving element DT1, DT2, and DT3 generates a current according to the gate-source voltage Vgs to drive the light emitting element EL. The driving elements DT1, DT2, and DT3 include a first electrode connected to the first nodes n11, n21, and n31, a gate electrode connected to the second nodes n12, n22, and n32, and a second electrode connected to the third nodes n13, n23, and n33, respectively.

The first capacitors Cst1, Cst2, and Cst3 are connected between the second nodes n12, n22, and n32 and the third nodes n13, n23, and n33, or between the second nodes n12, n22, and n32 and the fourth nodes n14, n24, and n34. The second capacitors C21, C22, and C23 are connected between the constant voltage node to which the constant voltage Vdc is applied and the third nodes n13, n23, and n33. The constant voltage Vdc may be set to a constant voltage of any one of EVDD, Vinit, and Vref.

The first-first switch element S01 may be turned on according to the gate-on voltage VEH of the first gate signal EM1 in the initialization step Ti, the sensing step Ts, the data writing step Tw, the boosting step Tboost, and the light emission step Tem to supply the pixel driving voltage EVDD to the first-first node n11. In another embodiment, the first gate signal EM1 may be inverted to the gate-off voltage VEL in the data writing step Tw. The first-first switch element S01 includes a first electrode connected to the first power line PL1 to which the pixel driving voltage EVDD is applied, a gate electrode connected to the first gate line GL1 to which the first gate signal EM1 is applied, and a second electrode connected to the first-first node n11.

The second-first switch element D01 has a channel width larger than the channel width of the first-first switch element S01. The second-first switch element D01 may be turned on according to the gate-on voltage VEH of the first gate signal EM1 in the initialization step Ti, the sensing step Ts, the data writing step Tw, the boosting step Tboost, and the light emission step Tem to supply the pixel driving voltage EVDD to the second-first and third-first nodes n21 and n31. In another embodiment, the first gate signal EM1 may be inverted to the gate-off voltage VEL in the data writing step Tw. The second-first switch element D01 includes a first electrode connected to the first power line PL1, a gate electrode connected to a first gate line GL1 to which the first gate signal EM1 is applied, and a second electrode connected to the second-first and third-first nodes n21 and n31.

The second switch elements M12, M22, and M32 are turned on according to the gate-on voltage VEH of the second gate signal EM2 in the initialization step Ti, the sensing step Ts, the data writing step Tw, the boosting step Tboost, and the light emission step Tem to connect the third nodes n13, n23, and n33 to the fourth nodes n14, n24, and n34, respectively. The first-second switch element M12 includes a first electrode connected to the first-third nodes n13, a gate electrode connected to a second gate line GL2 to which the second gate signal EM2 is applied, and a second electrode connected to the first-fourth nodes n14. The second-second switch element M22 includes a first electrode connected to the second-third node n23, a gate electrode connected to the second gate line GL2, and a second electrode connected to the second-fourth node n24. The third-second switch element M32 includes a first electrode connected to the third-third node n33, a gate electrode connected to the second gate line GL2, and a second electrode connected to the third-fourth node n34.

The second switch elements M12, M22, and M32 isolate the anode electrodes of the light emitting elements EL1, EL2, and EL3 from the third nodes n13, n23, and n33, respectively, so that ripples in the cathode voltage EVSS and voltage variations of the light emitting elements EL do not affect the gate-source voltage Vgs of the driving elements DT1, DT2, and DT3. Since an anode voltage of the light emitting element EL and the reference voltage Vref are separated, the gate-source voltages Vgs of the driving elements DT1, DT2, and DT3 do not change due to variations in the anode voltages of the light emitting elements EL1, EL2, and EL3. As a result, crosstalk is not recognized when pixel data of an image pattern that causes the crosstalk is written to the pixels of the display panel, and low gray scale speckles are not recognized.

The third switch elements M13, M23, and M33 are turned on in response to the pulse of the third gate signal SCAN synchronized with the data voltages Vdata1, Vdata2, and Vdata3 in the data writing step Tw to connect the data lines DL1, DL2, and DL3 to the second nodes n12, n22, and n32, respectively. The data voltages Vdata1, Vdata2, and Vdata3 are applied to the second nodes n12, n22, and n32, respectively, in the data writing step Tw. The first-third switch element M13 includes a first electrode connected to a first data line DL1 to which the data voltage Vdata1 is applied, a gate electrode connected to a third gate line GL3 to which the third gate signal SCAN is applied, and a second electrode connected to the first-second nodes n12. The second-third switch element M23 includes a first electrode connected to a second data line DL2 to which a data voltage Vdata2 is applied, a gate electrode connected to the third gate line GL3, and a second electrode connected to the second-second node n22. The third-third switch element M33 includes a first electrode connected to a third data line DL3 to which the data voltage Vdata3 is applied, a gate electrode connected to the third gate line GL3, and a second electrode connected to the third-second node n32.

The fourth switch elements M14, M24, and M34 are turned on according to the gate-on voltage VGH of the fourth gate signal INIT in the initialization step Ti and the sensing step Ts to apply the initialization voltage Vinit to the second nodes n12, n22, and n32, respectively. The first-fourth switch element M14 includes a first electrode connected to a third power line PL3 to which the initialization voltage Vinit is applied, a gate electrode connected to a fourth gate line GL4 to which the fourth gate signal INIT is applied, and a second electrode connected to the first-second nodes n12. The second-fourth switch element M24 includes a first electrode connected to the third power line PL3, a gate electrode connected to the fourth gate line GL4, and a second electrode connected to the second-second node n22. The third-fourth switch element M34 includes a first electrode connected to the third power line PL3, a gate electrode connected to the fourth gate line GL4, and a second electrode connected to the third-second node n32.

The fifth switch elements M15, M25, and M35 are turned on according to the gate-on voltage VGH of the fifth gate signal SENSE in the initialization step Ti to connect the third nodes n13, n23, and n33 to a fourth power line PL4 to which the reference voltage Vref is applied. The first-fifth switch element M15 includes a first electrode connected to the first-third nodes n13, a gate electrode connected to a fifth gate line GL5 to which the fifth gate signal SENSE is applied, and a second electrode connected to the fourth power line PLA. The second-fifth switch element M25 includes a first electrode connected to the second-third node n23, a gate electrode connected to the fifth gate line GL5, and a second electrode connected to the fourth power line PLA. The third-fifth switch element M35 includes a first electrode connected to the third-third node n33, a gate electrode connected to the fifth gate line GL5, and a second electrode connected to the fourth power line PL4.

Figure 5:
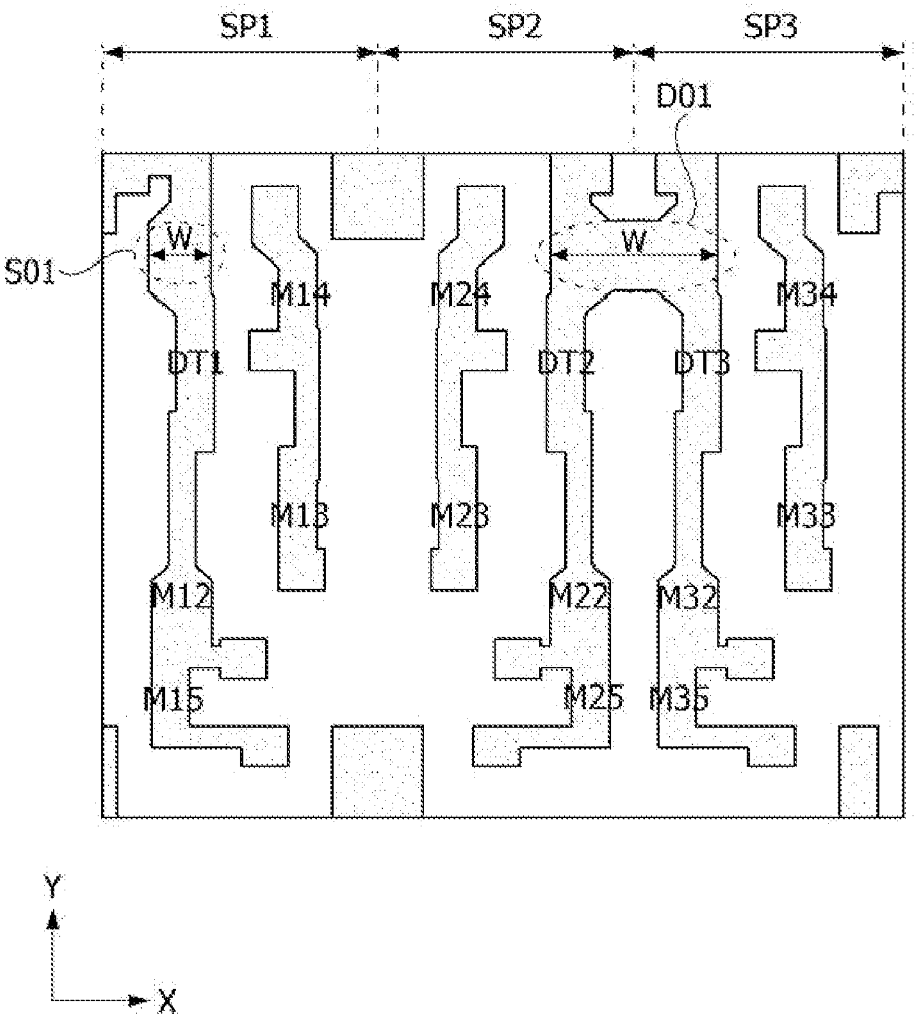
FIG. 5 is a plan view illustrating an example of a semiconductor pattern disposed on the sub-pixels shown in FIGS. 3A and 3B.

FIG. 5 is a plan view illustrating an example of a semiconductor pattern disposed on the sub-pixels shown in FIGS. 3A and 3B. As can be seen from FIG. 5, the channel width W of the second-first switch element D01 shared by the first and second sub-pixels SP2 and SP3 is more than twice as large as that of the first-first switch element S01 of the first sub-pixel SP1. The pixel circuits of the second and third sub-pixels SP2 and SP3 may be disposed in a left-right symmetrical structure or a flip structure Flip. By such a flip structure, the channel width of the second-first switch element D01 may be maximized without increasing the size of the pixel circuit.

Figure 6A:
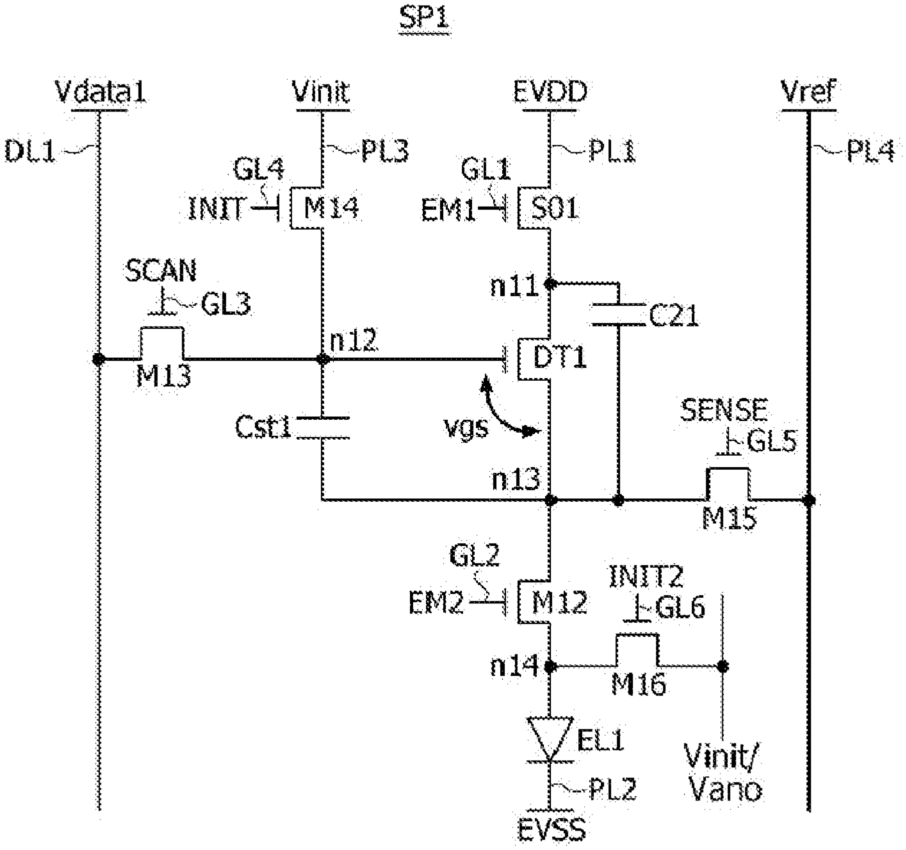
FIGS. 6A and 6B are circuit diagrams illustrating sub-pixels according to a second embodiment of the present disclosure.
Figure 6B:
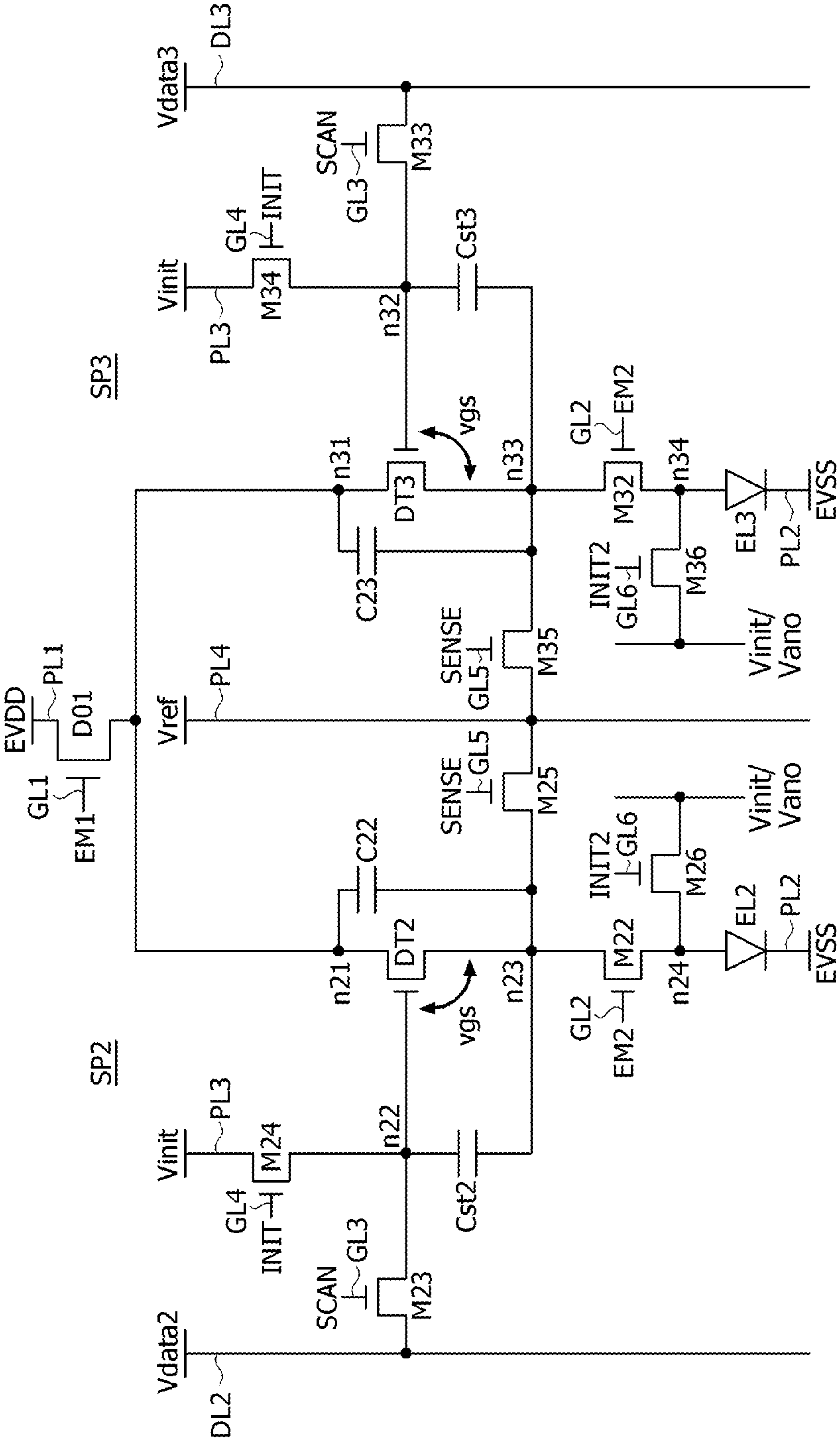
Figure 7:
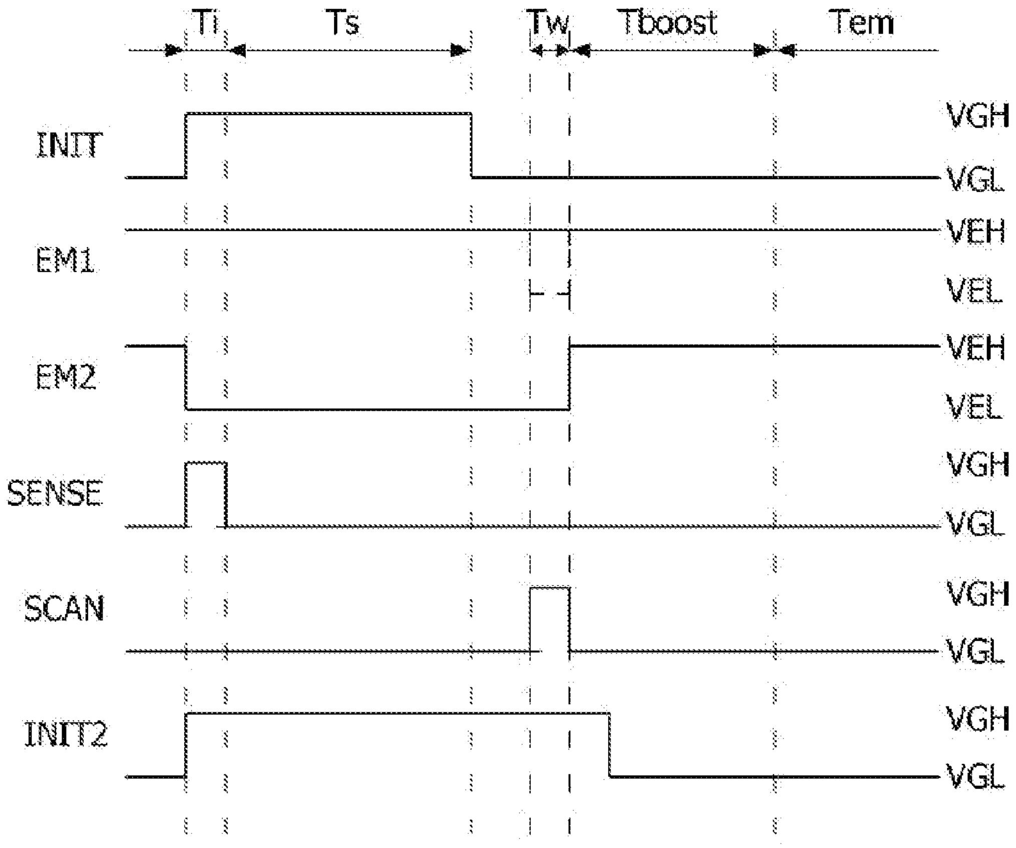
FIG. 7 is a waveform diagram illustrating gate signals applied to the pixel circuits shown in FIGS. 6A and 6B.

FIGS. 6A and 6B are circuit diagrams illustrating sub-pixels according to a second embodiment of the present disclosure. FIG. 6A is a circuit diagram illustrating a pixel circuit of the first sub-pixel SP1. FIG. 6B is a circuit diagram illustrating a pixel circuit of the second and third sub-pixels SP2 and SP3. FIG. 7 is a waveform diagram illustrating gate signals applied to the pixel circuits shown in FIGS. 6A and 6B. In this embodiment, descriptions substantially the same as those of the above-described embodiments will be omitted.

Referring to FIGS. 6A to 7, a first sub-pixel SP1 includes a first light emitting element EL1, a first driving element DT1 to drive the first light emitting element EL1, a plurality of switch elements S01, M12 to M16, a first-first capacitor Cst1, and a first-second capacitor C21. A second sub-pixel SP2 includes a second light emitting element EL2, a second driving element DT2 to drive the second light emitting element EL2, a plurality of switch elements D01, M22 to M26, a second-first capacitor Cst2, and a second-second capacitor C22. A third sub-pixel SP3 includes a third light emitting element EL3, a third driving element DT3 to drive the third light emitting element EL3, a plurality of switch elements D01, M32 to M36, a third-first capacitor Cst3, and a third-second capacitor C23. The driving elements DT1, DT2, and DT3 and the switch elements S01, M12 to M15, D01, M22 to M26, and M32 to M36 may be implemented as n-channel oxide TFTs.

The sub-pixels SP1, SP2, and SP3 are connected to a first power line PL1 to which a pixel driving voltage EVDD is applied, a second power line PL2 to which a cathode voltage EVSS is applied, a third power line PL3 to which an initialization voltage Vinit is applied, a fourth power line PL4 to which a reference voltage Vref is applied, data lines DL1, DL2, and DL3 to which data voltages Vdata1, Vdata2, and Vdata3 are applied, and gate lines GL1 to GL6 to which gate signals EM1, EM2, SCAN, INIT, SENSE, and INIT2 are applied. The pixel circuit may also be connected to a power line to which an anode voltage Vano is applied.

The constant voltages EVDD, EVSS, Vinit, Vref and Vano applied to the sub-pixels SP1, SP2, and SP3 include a voltage margin for the operation in a saturation region of the driving element DT. The constant voltages EVDD, EVSS, Vinit, Vref, and Vano applied to the sub-pixels SP1, SP2, and SP3 may be set as EVDD>Vano>Vinit>EVSS>Vref or EVDD>Vano>Vinit>Vref>EVSS.

The gate signals EM1, EM2, SCAN, INIT, SENSE, and INIT2 include pulses that swing between a gate-on voltage VGH and a gate-off voltage VGL. The gate signals EM1, EM2, SCAN, INIT, SENSE, INIT2 include a pulse of a first gate signal EM1, a pulse of a second gate signal EM2, a pulse of a third gate signal SCAN, a pulse of a fourth gate signal INIT, a pulse of a fifth gate signal SENSE, and a pulse of a sixth gate signal INIT2.

The sub-pixels SP1, SP2, and SP3 may be driven in an initialization step Ti, a sensing step Ts, a data writing step Tw, a boosting step Tboost, and a light emitting step Tem, as illustrated in FIG. 7.

In the initialization step Ti, the voltages of the first gate signal EM1, the fourth gate signal INIT, the fifth gate signal SENSE, and the sixth gate signal INIT2 are the gate-on voltages VEH and VGH, and the voltages of the third gate signal SCAN and the second gate signal EM2 are the gate-off voltages VGL and VEL. Therefore, in the initialization step Ti, the first-first, first-fourth, first-fifth, and first-sixth switch elements S01, M14, M15, and M16 of the first sub-pixel SP1 and the first driving element DT1 are turned on, while first-second and first-third switch elements M12 and M13 are turned off. At this time, the initialization voltage Vinit is applied to the first-second node n12, and the reference voltage Vref is applied to the first-third nodes n13. At the same time, the pixel driving voltage EVDD is applied to the first-first node n11 and the initialization voltage Vinit or anode voltage Vano is applied to the first-fourth node n14.

In the initialization step Ti, the second-first, second-fourth, second-fifth, second-sixth, third-fourth, third-fifth, and third-sixth switch elements D01, M24, M25, M26, M34, M35, and M36 of the second and third sub-pixels SP2 and SP3 and the driving elements DT2 and DT3 are turned on, while second-second, second-third, third-second, and third-third switch elements M22, M23, M32, and M33 are turned off. At this time, the initialization voltage Vinit is applied to the second-second and third-second nodes n22 and n32 and the reference voltage Vref is applied to the second-third and third-third nodes n23 and n33. Simultaneously, the pixel driving voltage EVDD is applied to the second-first and third-first nodes n21 and n31, and the initialization voltage Vinit or anode voltage Vano is applied to the second-fourth and third-fourth nodes n24 and n34.

In the sensing step Ts, the first gate signal EM1, the fourth gate signal INIT, and the sixth gate signal INIT2 maintain the gate-on voltage VEH and VGH, and the second gate signal EM2 and the third gate signal SCAN maintain the gate-off voltages VEL and VGL. In the sensing step Ts, the fifth gate signal SENSE is inverted to the gate-off voltage VGL. In the sensing step Ts, the first-first, first-fourth, and first-sixth switch elements S01, M14, and M16 of the first sub-pixel SP1 are turned on, while the first-second, first-third and first-fifth switch elements M12, M13, and M15 are turned off. The first driving element DT1 is turned off when the voltage of the first-third node n13 rises and its gate-source voltage Vgs reaches a threshold voltage Vth, and the threshold voltage Vth is stored in a first-first capacitor Cst1.

In the sensing step Ts, the second-first, second-fourth, second-sixth, third-fourth, and third-sixth switch elements D01, M24, M26, M34, and M36 of the second and third sub-pixels SP2 and SP3 are turned on, while the second-second, second-third, second-fifth, third-second, third-third, and third-fifth switch elements M22, M23, M25, M32, M33, and M35 are turned off. The second driving element DT2 is turned off when the voltage of the second-third node n23 rises and its gate-source voltage Vgs reaches a threshold voltage Vth, and the threshold voltage Vth is stored in the second-first capacitor Cst2. The third driving element DT3 is turned off when the voltage of the third-third node n33 rises and its gate-source voltage Vgs reaches a threshold voltage Vth, and the threshold voltage Vth is stored in the third-first capacitor Cst3.

In the data writing step Tw, the pulse of the third gate signal SCAN synchronized with the data voltage Vdata of the pixel data is generated as the gate-on voltage VGH. In the data writing step Tw, the sixth gate signal INIT2 maintains the gate-on voltage VGH. The second gate signal EM2, and the fourth and fifth gate signals INIT and SENSE are generated as the gate-off voltages VEL and VGL in the data writing step Tw. The first gate signal EM1 may be generated as a gate-on voltage VEH or a gate-off voltage VEL in the data writing step Tw. Therefore, the first-first and second-first switch elements S01 and D01 may be turned on or turned off in the data writing step Tw. When the first gate signal EM1 is the gate-on voltage VEH in the data writing step Tw, the voltage of the third node n3 may be changed according to the mobility of the driving element DT to compensate for a variation or deviation in the mobility of the driving element DT.

In the data writing step Tw, the first-first, first-third, and first-sixth switch elements S01, M13, and M16 of the first sub-pixel SP1 are turned on, while the first-second, first-fourth, and first-fifth switch elements M12, M14, and M15 are turned off. In the data writing step Tw, the second-first, second-third, second-sixth, third-third, and third-sixth switch elements D01, M23, M26, M33, and M36 of the second and third sub-pixels SP2 and SP3 are turned on, while the second-second, second-fourth, and second-fifth, third-second, third-fourth, and third-fifth switch elements M22, M24, M25, M32, M34, and M35 are turned off.

In the boosting step Tboost and the light emission step Tem, the voltages of the first and second gate signals EM1 and EM2 are the gate-on voltage VEH, and the voltages of the other gate signals SCAN, INIT, SENSE, and INIT2 are the gate-off voltage VGL. In the light emission step Tem, the first-first and first-second switch elements S01 and M12 of the first sub-pixel SP1 are turned on, while the remaining switch elements M13, M14, M15, and M16 are turned off. In the light emission step Tem, the second-first, second-second, and third-second switch elements D01, M22, and M32 of the second and third sub-pixels SP2 and SP3 are turned on, while the remaining switch elements M23, M24, M25, M26, M33, M34, M35, and M36 are turned off. In the light emission step Tem, the sub-pixels SP1, SP2, and SP3 operate as a source follower circuit to supply current to the light emitting elements EL1, EL2, and EL3 according to the gate-source voltage Vgs of the driving element DT. At this time, the light emitting elements EL1, EL2, and EL3 may be emitted at a luminance corresponding to the gray value of the pixel data. To improve the low gray scale expressiveness, the voltages of the first and second gate signals EM1 and EM2 may swing between the gate-on voltage VEH and the gate-off voltage VEL according to the duty ratio set by the predetermined pulse width modulation (PWM) in the light emission step Tem.

The light emitting elements EL1, EL2, and EL3 may be implemented with an OLED. The OLED may have a tandem structure with a plurality of light emitting layers stacked on top of each other. The OLED having the tandem structure may improve the luminance and lifespan of pixels.

The driving element DT1, DT2, and DT3 generates a current according to the gate-source voltages Vgs to drive the light emitting element EL. The driving elements DT1, DT2, and DT3 include a first electrode connected to the first nodes n11, n21, and n31, a gate electrode connected to the second nodes n12, n22, and n32, and a second electrode connected to the third nodes n13, n23, and n33, respectively.

The first capacitors Cst1, Cst2, and Cst3 are connected between the second nodes n12, n22, and n32 and the third nodes n13, n23, and n33, or between the second nodes n12, n22, and n32 and the fourth nodes n14, n24, and n34. The second capacitors C21, C22, and C23 are connected between the first node n11, n21, and n31 and the third node n13, n23, and n33.

The first-first switch element S01 may be turned on according to the gate-on voltage VEH of the first gate signal EM1 in the initialization step Ti, the sensing step Ts, the data writing step Tw, the boosting step Tboost, and the light emission step Tem to supply the pixel driving voltage EVDD to the first-first node n11. In another embodiment, the first gate signal EM1 may be inverted to the gate-off voltage VEL in the data writing step Tw. The first-first switch element S01 includes a first electrode connected to the first power line PL1 to which the pixel driving voltage EVDD is applied, a gate electrode connected to the first gate line GL1 to which the first gate signal EM1 is applied, and a second electrode connected to the first-first node n11.

The second-first switch element D01 has a channel width larger than the channel width of the first-first switch element S01. The second-first switch element D01 may be turned on according to the gate-on voltage VEH of the first gate signal EM1 in the initialization step Ti, the sensing step Ts, the data writing step Tw, the boosting step Tboost, and the light emission step Tem to supply the pixel driving voltage EVDD to the second-first and third-first nodes n21 and n31. In another embodiment, the first gate signal EM1 may be inverted to the gate-off voltage VEL in the data writing step Tw. The second-first switch element D01 includes a first electrode connected to the first power line PL1, a gate electrode connected to a first gate line GL1 to which the first gate signal EM1 is applied, and a second electrode connected to the second-first and third-first nodes n21 and n31.

The second switch elements M12, M22, and M32 are turned on according to the gate-on voltage VEH of the second gate signal EM2 in the boosting step Tboost and the light emission step Tem to connect the third nodes n13, n23, and n33 to the fourth nodes n14, n24, and n34, respectively. The first-second switch element M12 includes a first electrode connected to the first-third nodes n13, a gate electrode connected to a second gate line GL2 to which the second gate signal EM2 is applied, and a second electrode connected to the first-fourth nodes n14. The second-second switch element M22 includes a first electrode connected to the second-third node n23, a gate electrode connected to the second gate line GL2, and a second electrode connected to the second-fourth node n24. The third-second switch element M32 includes a first electrode connected to the third-third node n33, a gate electrode connected to the second gate line GL2, and a second electrode connected to the third-fourth node n34.

The third switch elements M13, M23, and M33 are turned on in response to the pulse of the third gate signal SCAN synchronized with the data voltages Vdata1, Vdata2, and Vdata3 in the data writing step Tw to connect the data lines DL1, DL2, and DL3 to the second nodes n12, n22, and n32, respectively. The first-third switch element M13 includes a first electrode connected to a first data line DL1 to which the data voltage Vdata1 is applied, a gate electrode connected to a third gate line GL3 to which the third gate signal SCAN is applied, and a second electrode connected to the first-second nodes n12. The second-third switch element M23 includes a first electrode connected to a second data line DL2 to which a data voltage Vdata2 is applied, a gate electrode connected to the third gate line GL3, and a second electrode connected to the second-second node n22. The third-third switch element M33 includes a first electrode connected to a third data line DL3 to which the data voltage Vdata3 is applied, a gate electrode connected to the third gate line GL3, and a second electrode connected to the third-second node n32.

The fourth switch elements M14, M24, and M34 are turned on according to the gate-on voltage VGH of the fourth gate signal INIT in the initialization step Ti and the sensing step Ts to apply the initialization voltage Vinit to the second nodes n12, n22, and n32, respectively. The first-fourth switch element M14 includes a first electrode connected to a third power line PL3 to which the initialization voltage Vinit is applied, a gate electrode connected to a fourth gate line GL4 to which the fourth gate signal INIT is applied, and a second electrode connected to the first-second nodes n12. The second-fourth switch element M24 includes a first electrode connected to the third power line PL3, a gate electrode connected to the fourth gate line GL4, and a second electrode connected to the second-second node n22. The third-fourth switch element M34 includes a first electrode connected to the third power line PL3, a gate electrode connected to the fourth gate line GL4, and a second electrode connected to the third-second node n32.

The fifth switch elements M15, M25, and M35 are turned on according to the gate-on voltage VGH of the fifth gate signal SENSE in the initialization step Ti to connect the third nodes n13, n23, and n33 to a fourth power line PL4 to which the reference voltage Vref is applied. The first-fifth switch element M15 includes a first electrode connected to the first-third nodes n13, a gate electrode connected to a fifth gate line GL5 to which the fifth gate signal SENSE is applied, and a second electrode connected to the fourth power line PLA. The second-fifth switch element M25 includes a first electrode connected to the second-third node n23, a gate electrode connected to the fifth gate line GL5, and a second electrode connected to the fourth power line PLA. The third-fifth switch element M35 includes a first electrode connected to the third-third node n33, a gate electrode connected to the fifth gate line GL5, and a second electrode connected to the fourth power line PL4.

The sixth switch elements M16, M26, and M36 are turned on according to the gate-on voltage VGH of the sixth gate signal INIT2 in the initialization step Ti, the sensing step Ts, and the data writing step Tw to apply the initialization voltage Vinit or the anode voltage Vano to the fourth nodes n14, n24, and n34. The first-sixth switch element M16 includes a first electrode connected to the first-fourth node n14, a gate electrode connected to a sixth gate line GL6 to which the sixth gate signal INIT2 is applied, and a second electrode connected to a third power line PL3 or a power line to which the anode voltage Vano is applied. The second-sixth switch element M26 includes a first electrode connected to the second-fourth node n24, a gate electrode connected to the sixth gate line GL6, and a second electrode connected to the third power line PL3 or the power line to which the anode voltage Vano is applied. The third-sixth switch element M36 includes a first electrode connected to the third-fourth node n34, a gate electrode connected to the sixth gate line GL6, and a second electrode connected to the third power line PL3 or the power line to which the anode voltage Vano is applied.

Figure 8A:
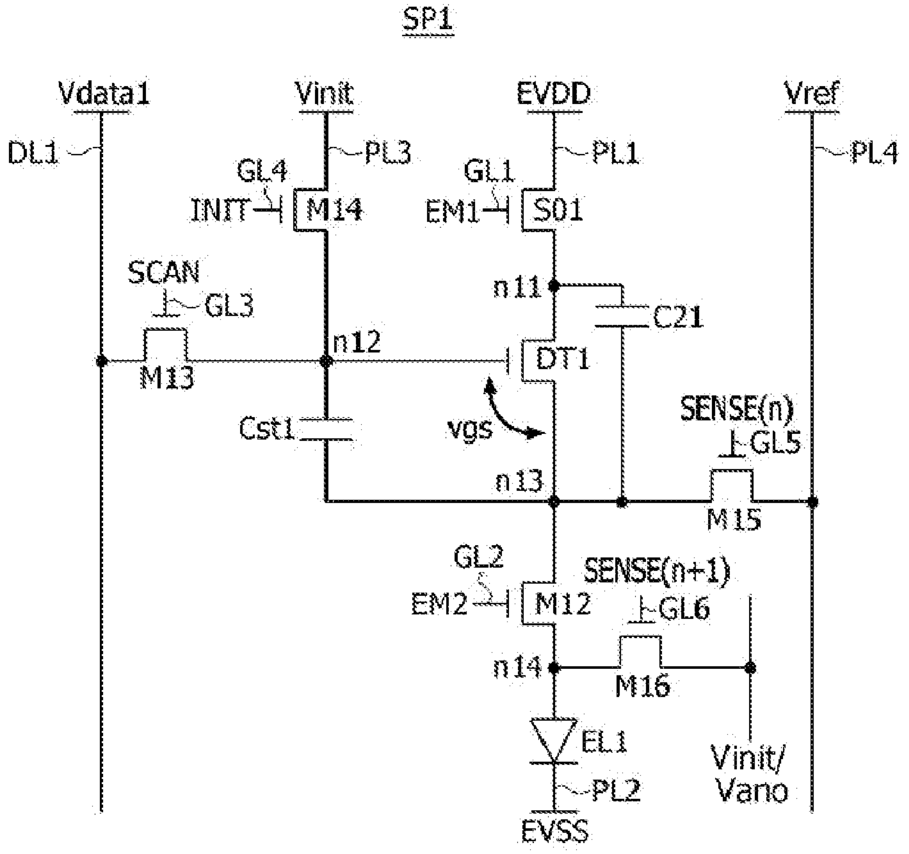
FIGS. 8A and 8B are circuit diagrams illustrating sub-pixels according to a third embodiment of the present disclosure.
Figure 8B:
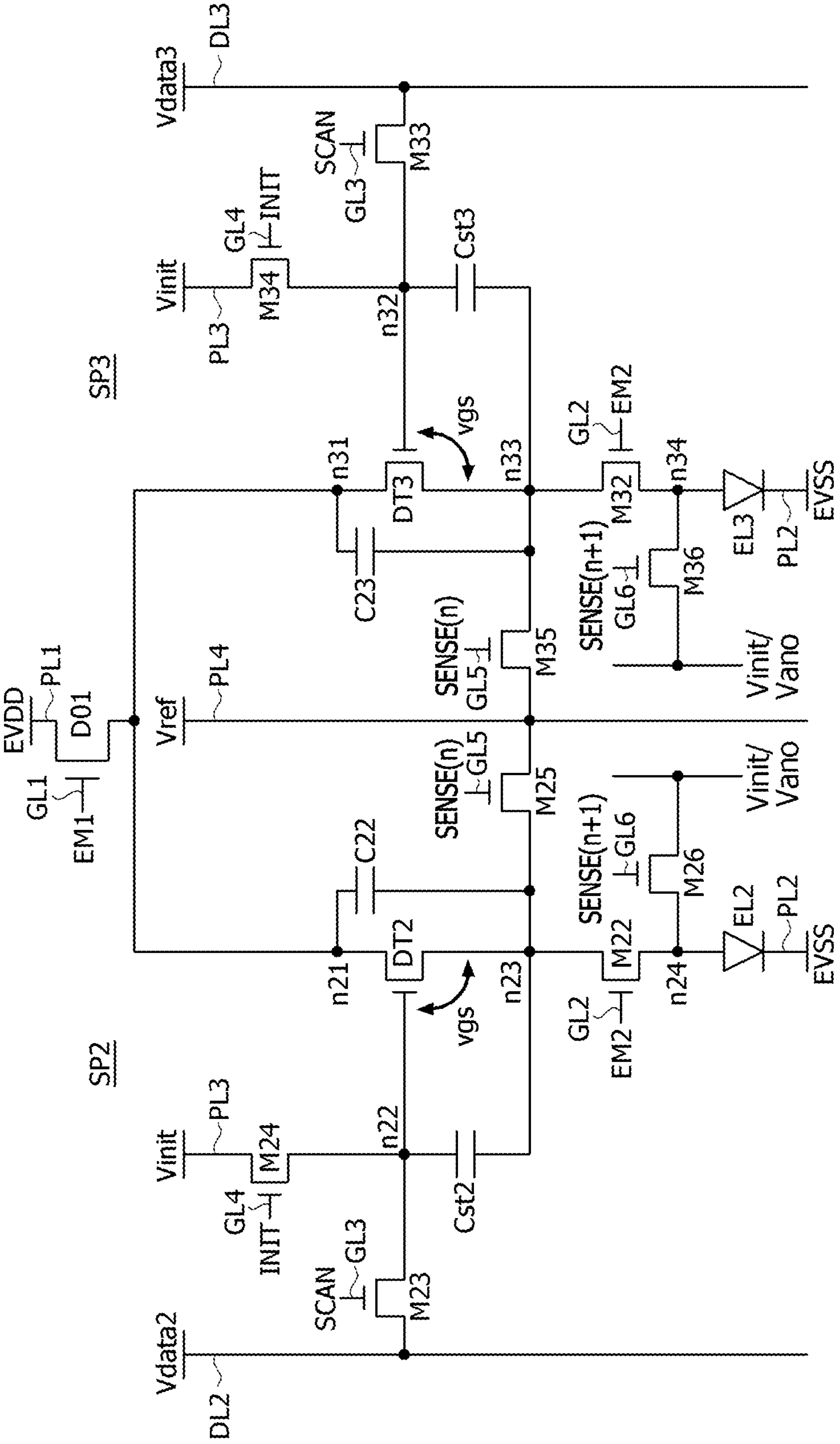
Figure 9:
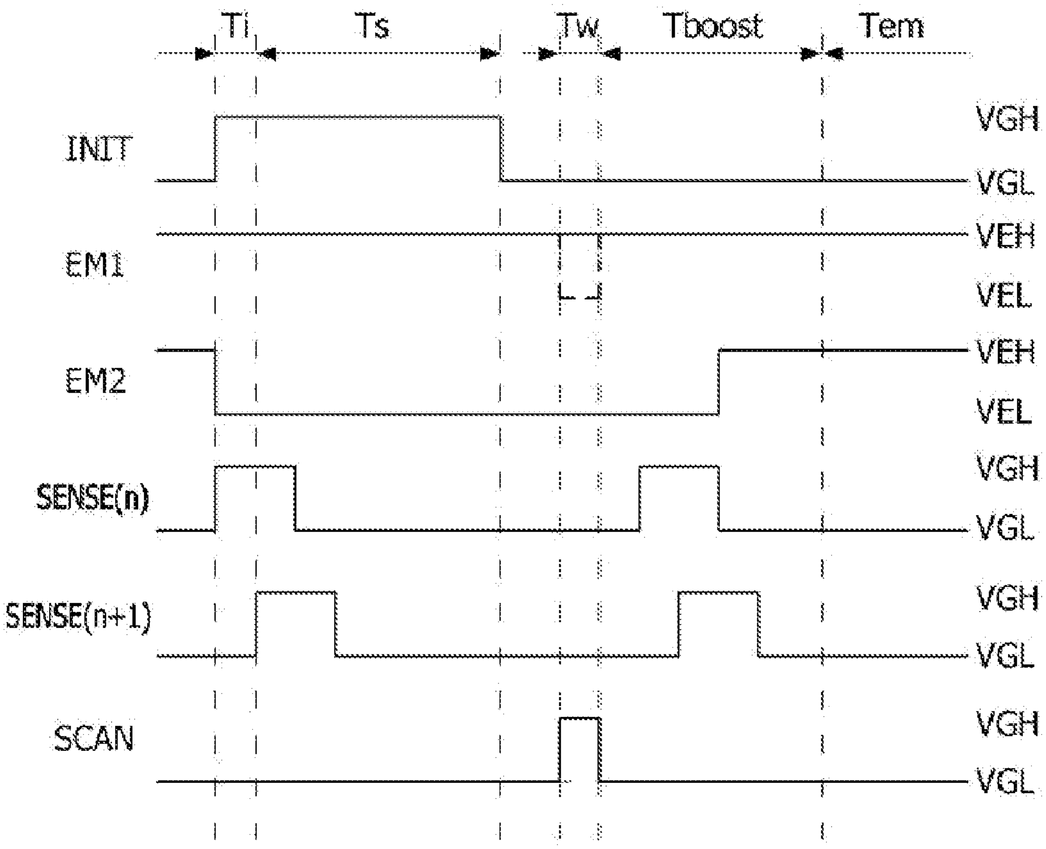
FIG. 9 is a waveform diagram illustrating gate signals applied to the pixel circuits shown in FIGS. 8A and 8B.

FIGS. 8A and 8B are circuit diagrams illustrating sub-pixels according to a third embodiment of the present disclosure. FIG. 8A is a circuit diagram illustrating a pixel circuit of the first sub-pixel SP1. FIG. 8B is a circuit diagram illustrating a pixel circuit of the second and third sub-pixels SP2 and SP3. FIG. 9 is a waveform diagram illustrating gate signals applied to the pixel circuits shown in FIGS. 8A and 8B. In this embodiment, descriptions substantially the same as those of the above-described embodiments will be omitted. Compared to the second embodiment described above, a sixth gate signal SENSE(n+1) in this embodiment, which controls sixth switch elements M16, M26, and M36, is different from that of the second embodiment INIT2.

Referring to FIGS. 8A to 9, gate signals EM1, EM2, SCAN, INIT, SENSE(n), and SENSE(n+1) include pulses that swing between the gate-on voltage VGH and the gate-off voltage VGL. The gate signals EM1, EM2, SCAN, INIT, SENSE(n), and SENSE(n+1) include a pulse of a first gate signal EM1, a pulse of a second gate signal EM2, a pulse of a third gate signal SCAN, a pulse of a fourth gate signal INIT, a pulse of a fifth gate signal SENSE, and a pulse of the sixth gate signal SENSE(n+1).

The pulses of the fifth gate signal SENSE(n) and the sixth gate signal SENSE(n+1) have the same pulse width and the same period. The sixth gate signal SENSE(n+1) is delayed in phase by one horizontal period relative to the fifth gate signal SENSE(n). The pulse widths of the fifth gate signal SENSE(n) and the sixth gate signal SENSE(n+1) may be set to a pulse width of two horizontal periods, and the third gate signal SCAN may be set to a pulse width of one horizontal period.

In the initialization step Ti, the voltages of the first gate signal EM1, the fourth gate signal INIT, and the fifth gate signal SENSE(n) are gate-on voltages VEH and VGH, and the voltages of the second, third, and sixth gate signals EM2, SCAN, and SENSE(n+1) are gate-off voltages VEL and VGL.

In the sensing step Ts, the first and fourth gate signals EM1 and INIT maintain the gate-on voltages VEH and VGH, and the second gate signal EM2 and the third gate signal SCAN maintain the gate-off voltage VEL and VGL. The fifth and sixth gate signals SENSE(n) and SENSE(n+1) are generated as the gate-on voltage VGH at the beginning of the sensing step Ts and then inverted to the gate-off voltage VGL.

In the data writing step Tw, the pulse of the third gate signal SCAN synchronized with the data voltage Vdata of the pixel data is generated as the gate-on voltage VGH. The second, fourth, fifth, and sixth gate signals EM2, INIT, SENSE(n), and SENSE(n+1) are generated as the gate-off voltages VEL and VGL in the data writing step Tw. The first gate signal EM1 may be generated as a gate-on voltage VEH or a gate-off voltage VEL in the data writing step Tw.

In the boosting step Tboost, the second gate signal EM2 is inverted to the gate-on voltage VEH, and the pulses of the fifth and sixth gate signals SENSE(n) and SENSE(n+1) are generated. In the light emission step Tem, the voltage of the first and second gate signals EM1 and EM2 are the gate-on voltage VEH, and the voltages of the other gate signals SCAN, INIT, SENSE(n), and SENSE(n+1) are the gate-off voltage VGL. The voltages of the first and second gate signals EM1 and EM2 may swing between the gate on voltage VEH and the gate off voltage VEL according to the duty ratio set by the predetermined pulse width modulation (PWM) in the light emission step Tem.

The sixth switch elements M16, M26, and M36 are turned on according to the gate-on voltage VGH of the sixth gate signal SENSE(n+1) in the sensing step Ts and the boosting step Tboost to apply an initialization voltage Vinit or an anode voltage Vano to the fourth nodes n14, n24, and n34. The first-sixth switch element M16 includes a first electrode connected to the first-fourth nodes n14, a gate electrode connected to a sixth gate line GL6 to which the sixth gate signal SENSE(n+1) is applied, and a second electrode connected to a third power line PL3 or a power line to which an anode voltage Vano is applied. The second-sixth switch element M26 includes a first electrode connected to the second-fourth node n24, a gate electrode connected to the sixth gate line GL6, and a second electrode connected to the third power line PL3 or the power line to which the anode voltage Vano is applied. The third-sixth switch element M36 includes a first electrode connected to the third-fourth node n34, a gate electrode connected to the sixth gate line GL6, and a second electrode connected to the third power line PL3 or the power line to which the anode voltage Vano is applied.

FIGS. 8A and 8B are circuit diagrams illustrating sub-pixels according to a third embodiment of the present disclosure. FIG. 8A is a circuit diagram illustrating a pixel circuit of the first sub-pixel SP1. FIG. 8B is a circuit diagram illustrating a pixel circuit of the second and third sub-pixels SP2 and SP3. FIG. 9 is a waveform diagram illustrating gate signals applied to the pixel circuits shown in FIGS. 8A and 8B. In this embodiment, descriptions substantially the same as those of the above-described embodiments will be omitted. Compared to the second embodiment described above, a sixth gate signal SENSE(n+1) in this embodiment, which controls sixth switch elements M16, M26, and M36, is different from that of the second embodiment INIT2.

Referring to FIGS. 8A to 9, gate signals EM1, EM2, SCAN, INIT, SENSE(n), and SENSE(n+1) include pulses that swing between the gate-on voltage VGH and the gate-off voltage VGL. The gate signals EM1, EM2, SCAN, INIT, SENSE(n), and SENSE(n+1) include a pulse of a first gate signal EM1, a pulse of a second gate signal EM2, a pulse of a third gate signal SCAN, a pulse of a fourth gate signal INIT, a pulse of a fifth gate signal SENSE, and a pulse of the sixth gate signal SENSE(n+1).

The pulses of the fifth gate signal SENSE(n) and the sixth gate signal SENSE(n+1) have the same pulse width and the same period. The sixth gate signal SENSE(n+1) is delayed in phase by one horizontal period relative to the fifth gate signal SENSE(n). The pulse widths of the fifth gate signal SENSE(n) and the sixth gate signal SENSE(n+1) may be set to a pulse width of two horizontal periods, and the third gate signal SCAN may be set to a pulse width of one horizontal period.

In the initialization step Ti, the voltages of the first gate signal EM1, the fourth gate signal INIT, and the fifth gate signal SENSE(n) are gate-on voltages VEH and VGH, and the voltages of the second, third, and sixth gate signals EM2, SCAN, and SENSE(n+1) are gate-off voltages VEL and VGL.

In the sensing step Ts, the first and fourth gate signals EM1 and INIT maintain the gate-on voltages VEH and VGH, and the second gate signal EM2 and the third gate signal SCAN maintain the gate-off voltage VEL and VGL. The fifth and sixth gate signals SENSE(n) and SENSE(n+1) are generated as the gate-on voltage VGH at the beginning of the sensing step Ts and then inverted to the gate-off voltage VGL.

In the data writing step Tw, the pulse of the third gate signal SCAN synchronized with the data voltage Vdata of the pixel data is generated as the gate-on voltage VGH. The second, fourth, fifth, and sixth gate signals EM2, INIT, SENSE(n), and SENSE(n+1) are generated as the gate-off voltages VEL and VGL in the data writing step Tw. The first gate signal EM1 may be generated as a gate-on voltage VEH or a gate-off voltage VEL in the data writing step Tw.

In the boosting step Tboost, the second gate signal EM2 is inverted to the gate-on voltage VEH, and the pulses of the fifth and sixth gate signals SENSE(n) and SENSE(n+1) are generated. In the light emission step Tem, the voltage of the first and second gate signals EM1 and EM2 are the gate-on voltage VEH, and the voltages of the other gate signals SCAN, INIT, SENSE(n), and SENSE(n+1) are the gate-off voltage VGL. The voltages of the first and second gate signals EM1 and EM2 may swing between the gate on voltage VEH and the gate off voltage VEL according to the duty ratio set by the predetermined pulse width modulation (PWM) in the light emission step Tem.

The sixth switch elements M16, M26, and M36 are turned on according to the gate-on voltage VGH of the sixth gate signal SENSE(n+1) in the sensing step Ts and the boosting step Tboost to apply the initialization voltage Vinit or the anode voltage Vano to the fourth nodes n14, n24, and n34. The first-sixth switch element M16 includes a first electrode connected to the first-fourth nodes n14, a gate electrode connected to a sixth gate line GL6 to which the sixth gate signal SENSE(n+1) is applied, and a second electrode connected to a third power line PL3 or a power line to which the anode voltage Vano is applied. The second-sixth switch element M26 includes a first electrode connected to the second-fourth node n24, a gate electrode connected to the sixth gate line GL6, and a second electrode connected to the third power line PL3 or the power line to which the anode voltage Vano is applied. The third-sixth switch element M36 includes a first electrode connected to the third-fourth node n34, a gate electrode connected to the sixth gate line GL6, and a second electrode connected to the third power line PL3 or the power line to which the anode voltage Vano is applied.

Figure 10:
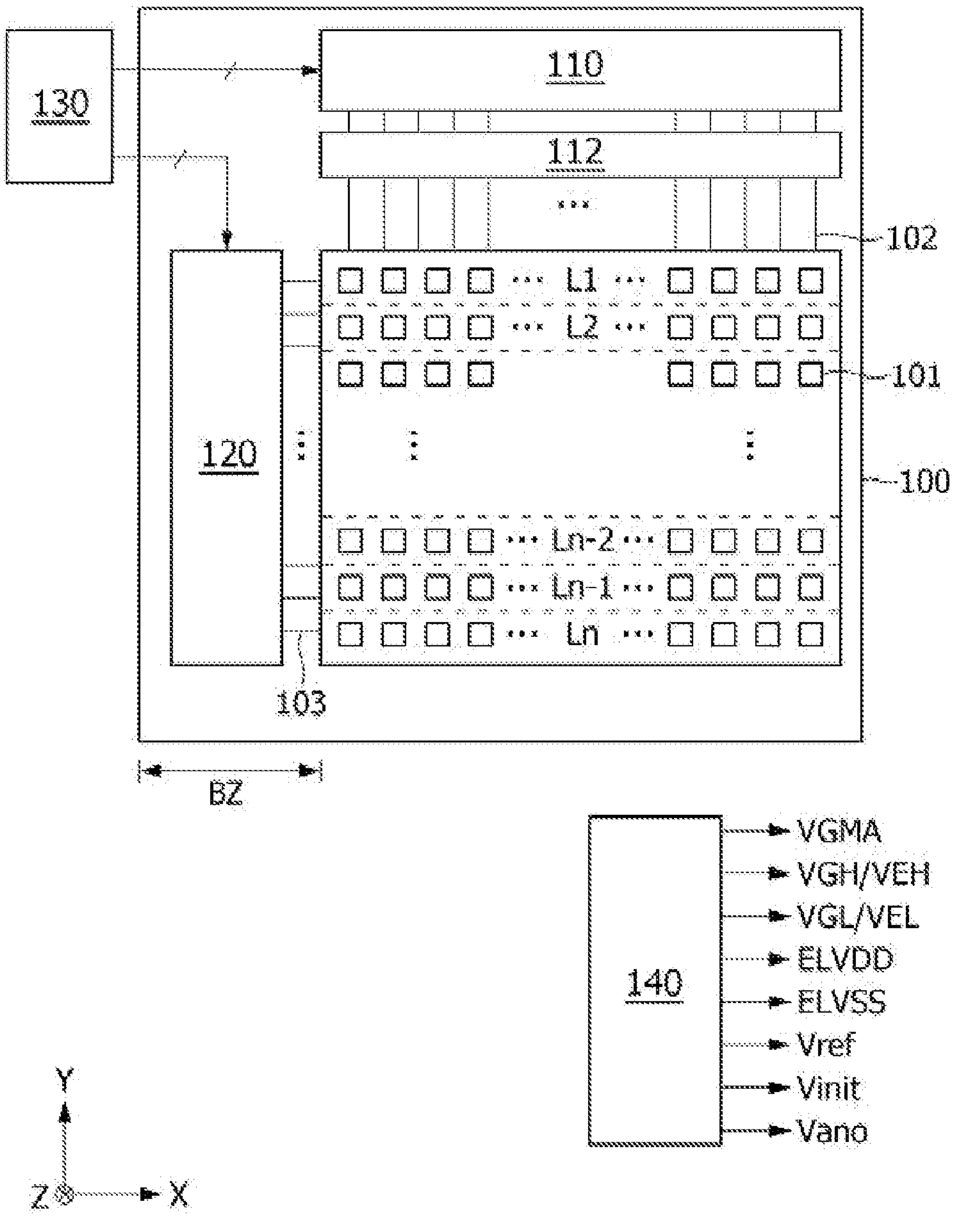
FIG. 10 is a block diagram illustrating a display device according to an embodiment of the present disclosure.
Figure 11:
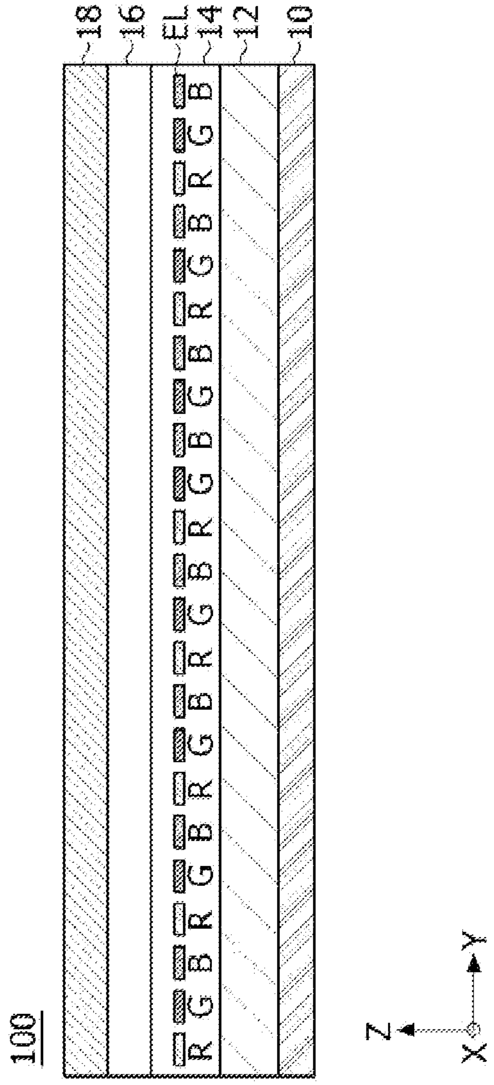
FIG. 11 is a cross-sectional view illustrating a cross-sectional structure of the display panel shown in FIG. 10.

FIG. 10 is a block diagram illustrating a display device according to an embodiment of the present disclosure. FIG. 11 is a cross-sectional view illustrating a cross-sectional structure of the display panel shown in FIG. 10.

Referring to FIGS. 10 and 11, the display device according to an embodiment of the present disclosure includes a display panel 100, a display panel driver for writing pixel data to pixels of the display panel 100, and a power supply 140 for generating power necessary to drive the pixels and the display panel driver.

The display panel 100 may be a rectangular-shaped display panel having a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 intersecting the data lines 102, and pixels 101 arranged in a matrix form. The display panel 100 may further include power lines commonly connected to the pixels.

The pixel array includes a plurality of pixel lines L1 to Ln. Each of the pixel lines L1 to Ln includes one line of pixels arranged along a line direction X in the pixel array of the display panel 100. The pixels arranged in one pixel line share the gate lines 103. Sub-pixels arranged in the column direction Y along a data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible.

The display panel may be manufactured as a flexible display panel. The flexible display panel may be implemented as an OLED panel using a plastic substrate. A pixel array and a light emitting element in a plastic OLED panel may be disposed on an organic thin film adhered onto a back plate.

Each of the pixels 101 may be divided into a red sub-pixel, a green sub-pixel, and a blue sub-pixel for color implementation. Each of the pixels may further include a white sub-pixel. Each of the sub-pixels includes a pixel circuit. Hereinafter, a pixel may be interpreted as having the same meaning as a sub-pixel. Each of the pixel circuits is connected to the data lines, the gate lines, and the power lines as shown in FIGS. 3A to 8B.

The pixels may be arranged as real color pixels and pentile pixels. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

Touch sensors may be disposed on the screen of the display panel 100. The touch sensors may be disposed as an on-cell type or an add-on type on the screen of the display panel or implemented as in-cell type touch sensors embedded in the pixel array AA.

In a cross-sectional structure, the display panel 100 may include a circuit layer 12, a light emitting element layer 14, and an encapsulation layer 16 stacked on a substrate 10, as shown in FIG. 2.

The circuit layer 12 may include pixel circuits connected to wirings such as the data lines, the gate lines, and the power lines, a gate driver(s) 120 connected to the gate lines, a demultiplexer array 112, a circuit for auto probe inspection, which is omitted from the drawing, and the like. The wirings and circuit elements in the circuit layer 12 may include a plurality of insulating layers, two or more metal layers separated with the insulating layer therebetween, and an active layer including a semiconductor material. All transistors formed in the circuit layer 12 may be implemented with oxide TFTs including n-channel type oxide semiconductors.

A light emitting element layer 14 may include a light emitting element EL driven by the pixel circuit. The light-emitting elements EL may include a red (R) light-emitting element, a green (G) light-emitting element, and a blue (B) light-emitting element. The light emitting element layer 14 may include a white light emitting element and a color filter. The light-emitting elements EL in the light-emitting element layer 14 may be covered by multiple protective layers including an organic film and an inorganic film.

An encapsulation layer 16 covers the light-emitting element layer 14 so as to seal the circuit layer 12 and the light-emitting element layer 14. The encapsulation layer 16 may also have a multi-insulating film structure in which an organic film and an inorganic film are alternately stacked. The inorganic film blocks permeation of moisture and oxygen. The organic film planarizes the surface of the inorganic film. When the organic film and the inorganic film are stacked in multiple layers, the movement path of moisture and oxygen becomes longer than that of a single layer, so that penetration of moisture and oxygen affecting the light emitting element layer 14 may be effectively blocked.

A touch sensor layer 18 may be disposed on the encapsulation layer 16. The touch sensor layer 180 may include capacitive touch sensors that sense touch inputs based on changes in capacitance before and after the touch input. The touch sensor layer may include metal wiring patterns and insulating films forming the capacitance of the touch sensors. The capacitance of the touch sensor may be formed between the metal wiring patterns. A polarizing plate, not shown, may be disposed on the touch sensor layer. The polarizing plate may improve visibility and contrast ratio by converting the polarization of external light reflected by metals of the touch sensor layer and the circuit layer 12. The polarizing plate may be implemented as a circular polarizing plate or a polarizing plate in which a linear polarizing plate and a phase retardation film are bonded. A cover glass may be adhered to the polarizer.

The display panel 100 may further include a color filter layer disposed on the touch sensor layer 18. The color filter layer is not illustrated. The color filter layer may include red, green, and blue color filters and a black matrix pattern. The color filter layer absorbs a portion of the wavelength of light reflected from the circuit layer and the touch sensor layer, so that it can replace the polarizer and increase the color purity. In this embodiment, the color filter layer having a higher light transmittance than the polarizing plate may be applied to the display panel 100 to improve the light transmittance of the display panel 100 and improve the thickness and flexibility of the display panel 100. A cover glass may be bonded to the color filter layer.

The power supply 140 generates DC power required for driving the pixel array and the display panel driver of the display panel 100 by using a DC-DC converter. The DC-DC converter may include a charge pump, a regulator, a buck converter, a boost converter, and the like. The power supply 140 may adjust the level of a DC input voltage applied from a host system, not shown, and may thus generate constant voltages (or DC voltages) such as the gamma reference voltage VGMA, the gate-on voltages VGH, and VEH, the gate-off voltages VGL and VEL, the pixel driving voltage EVDD, the cathode voltage EVSS, the reference voltage Vref, the initialization voltage Vinit, and the anode voltage Vano. The gamma reference voltage VGMA is supplied to the data driver 110. The gate-on voltages VGH and VEH and the gate-off voltages VGL and VEL are supplied to the gate driver 120. The constant voltages such as the pixel driving voltage EVDD, the cathode voltage EVSS, the reference voltage Vref, the initialization voltage Vinit, and the anode voltage Vano are commonly supplied to the pixels.

The display panel driver writes pixel data of an input image onto the pixels of the display panel 100 under the control of a timing controller, TCON, 130.

The display panel driver includes the data driver 110 and the gate driver 120. The display panel driver may further include a demultiplexer array 112 disposed between the data driver 110 and the data lines 102.

The demultiplexer array 112 sequentially supplies the data voltages outputted from each of the channels of the data driver 110 to the data lines 102 by using a plurality of demultiplexers DEMUX. A demultiplexer may include a multiple of switch elements disposed on the display panel 100. When the demultiplexer is disposed between the output terminals of the data driver 110 and the data lines 102, the number of channels in the data driver 110 may be reduced. The demultiplexer array 112 may be omitted.

The display panel driver may further include a touch sensor driver for driving the touch sensors. The touch sensor driver is omitted from FIG. 1. The data driver and the touch sensor driver may be integrated into one drive integrated circuit (IC). In a mobile device or a wearable device, the timing controller 130, the power supply 140, the data driver 110, the touch sensor driver, and the like may be integrated into one drive IC.

The display panel driver may operate in a low-speed driving mode under the control of the timing controller 130. The low-speed driving mode may be set to reduce power consumption of the display device when an input image does not change for a preset time as a result of analyzing the input image. In the low-speed driving mode, the power consumption in the display panel driver and the display panel 100 may be reduced by lowering a refresh rate of the pixels when still images are inputted for a predetermined time or longer. The low-speed driving mode is not limited to a case where the still image is inputted. For example, when the display device operates in a standby mode or when a user command or an input image is not inputted to the display panel driver for a predetermined time or longer, the display panel driver may operate in the low-speed driving mode.

The data driver 110 generates a data voltage by converting pixel data of an input image, which is received as a digital signal from the timing controller 130 every frame period, into a gamma compensation voltage by using a digital to analog converter (DAC). The gamma reference voltage VGMA is divided into gamma compensation voltages for each gray scale through a voltage divider circuit and supplies them to the DAC. The data voltage is outputted through an output buffer from each of the channels of the data driver 110.

The gate driver 120 may be implemented with a gate in panel (GIP) circuit formed directly on the circuit layer 12 in the display panel 100 together with TFT arrays and wirings in the pixel array. The GIP circuit may be disposed in a bezel (BZ) region, which is a non-display region, of the display panel 100 or may be dispersely disposed in the pixel array in which an input image is reproduced. The gate driver 120 sequentially outputs gate signals to the gate lines 103 under the control of the timing controller 130. The gate driver 120 may sequentially supply the gate signals to the gate lines 103 by shifting the gate signals using a shift register. The gate signals may include a scan pulse, an emission control pulse (or EM pulse), an initialization pulse, and a sensing pulse.

The shift register of the gate driver 120 outputs pulses of the gate signals in response to a start pulse and a shift clock from the timing controller 130, and shifts the pulses according to a shift clock timing.

The timing controller 130 receives, from the host system, digital video data DATA of the input image and a timing signal synchronized with the digital video data. The timing signal may include a vertical synchronization signal Vsync, a horizontal synchronization signal Hsync, a clock CLK, and a data enable signal DE. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system may be one of a television (TV) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 13 together with the timing signal.

The timing controller 130 may multiply the input frame frequency by i (i is a natural number) in a normal driving mode, so that it can control the operation timing of the display panel driver at a frame frequency of the input frame frequency×i Hz. The input frame frequency is 60 Hz in the NTSC (National Television Standards Committee) system and 50 Hz in the PAL (Phase-Alternating Line) system. In order to lower the refresh rate of pixels in the low-speed driving mode, the timing controller 130 may reduce the driving frequency for the display panel driver by reducing the frame frequency to a frequency between 1 Hz and 30 Hz.

The timing controller 130 generates a data timing control signal for controlling the operation timing of the data driver 110 based on the timing signals Vsync, Hsync, and DE received from the host system, a control signal for controlling the operation timing of the de-multiplexer array 112, and a gate timing control signal for controlling the operation timing of the gate driver 120. The timing controller 130 synchronizes the data driver 110, the de-multiplexer array 112, the touch sensor driver, and the gate driver 120 by controlling the operation timing of the display panel driver.

The voltage level of the gate timing control signal outputted from the timing controller 130 may be inputted to a level shifter, not shown. The level shifter receives the gate timing control signal and generates the start pulse and the shift clock that swing between the gate on voltages VGH and VEH and the gate off voltages VGL and VEL.

Due to device characteristic deviations and process deviations caused in the manufacturing process of the display panel 100, there may be differences in electrical characteristics of the driving element among pixels, and such differences may increase as driving time of the pixels elapses. In order to compensate for the deviations in the electrical characteristic of the driving element among pixels, an internal compensation technique or an external compensation technique may be applied to an organic light emitting display device. The internal compensation technique samples a threshold voltage of the driving element for each sub-pixel by using an internal compensation circuit implemented in each pixel circuit and compensates the gate-source voltage Vgs of the driving element by the threshold voltage. The external compensation technique senses in real time a current or voltage of the driving element that varies according to electrical characteristics of the driving element by using an external compensation circuit. The external compensation technique compensates for the deviation (or variation) of the electrical characteristics of the driving element in each pixel in real time by modulating the pixel data (digital data) of the input image by the electrical characteristic deviation (or variation) of the driving element sensed for each pixel. The display panel driver may drive pixels using the external compensation technique and/or the internal compensation technique. As shown in FIGS. 3A to 9, the pixel circuit of the present disclosure may include an internal compensation circuit that senses and compensates for a threshold voltage of the driving element DT, and compensates for mobility thereof.

The technical effects to be achieved by the present disclosure, the means for achieving the technical effects, and technical features of the present disclosure described above do not specify features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. All the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A pixel circuit comprising:

a first driving element including a first electrode connected to a first-first node, a gate electrode connected to a first-second node, and a second electrode connected to a first-third node;

a first light emitting element configured to be driven by a current from the first driving element;

a first-first switch element configured to apply a pixel driving voltage to the first-first node in response to a first gate signal, the first-first switch element having a first channel width;

a second driving element including a first electrode connected to a second-first node, a gate electrode connected to a second-second node, and a second electrode connected to a second-third node;

a second light emitting element configured to be driven by a current from the second driving element;

a third driving element including a first electrode connected to a third-first node, a gate electrode connected to a third-second node, and a second electrode connected to a third-third node;

a third light emitting element configured to be driven by a current from the third driving element;

a first-second switch element connected between the first-third node and a first-fourth node;

a second-second switch element connected between the second-third node and a second-fourth node; and a third-second switch element connected between the third-third node and a third-fourth node, wherein:

the first-second switch element is configured to connect the first-third node to the first-fourth node in response to a second gate signal;

the second-second switch element is configured to connect the second-third node to the second-fourth node in response to the second gate signal;

the third-second switch element is configured to connect the third-third node to the third-fourth node in response to the second gate signal;

the first light emitting element includes an anode electrode connected to the first-fourth node and a cathode electrode connected to receive a cathode voltage;

the second light emitting element includes an anode electrode connected to the second-fourth node and a cathode electrode connected to receive the cathode voltage; and the third light emitting element includes an anode electrode connected to the third-fourth node and a cathode electrode connected to receive the cathode voltage a second-first switch element configured to apply the pixel driving voltage to the second-first node and the third-first node in response to the first gate signal, the second-first switch element having a second channel width, wherein the second channel width of the second-first switch element is larger than the first channel width of the first-first switch element.

2. The pixel circuit of claim 1, further comprising:

a first-first capacitor connected between the first-second node and the first-third node or between the first-second node and the first-fourth node;

a first-second capacitor connected between a node configured to receive a constant voltage and the first-third node;

a second-first capacitor connected between the second-second node and the second-third node or between the second-second node and the second-fourth node;

a second-second capacitor connected between a node configured to receive the constant voltage and the second-third node;

a third-first capacitor connected between the third-second node and the third-third node or between the third-second node and the third-fourth node; and a third-second capacitor connected between a node configured to receive the constant voltage and the third-third node.

3. The pixel circuit of claim 1, further comprising:

a first-third switch element connected between a first data line configured to receive a first data voltage and the first-second node;

a second-third switch element connected between a second data line configured to receive a second data voltage and the second-second node; and a third-third switch element connected between a third data line configured to receive a third data voltage and the third-second node, wherein:

the first-third switch element is configured to connect the first data line to the first-second node in response to a third gate signal;

the second-third switch element is configured to connect the second data line to the second-second node in response to the third gate signal; and the third-third switch element is configured to connect the third data line to the third-second node in response to the third gate signal.

4. The pixel circuit of claim 3, further comprising:

a first-fourth switch element configured to apply an initialization voltage to the first-second node in response to a fourth gate signal;

a second-fourth switch element configured to apply the initialization voltage to the second-second node in response to the fourth gate signal; and a third-fourth switch element configured to apply the initialization voltage to the third-second node in response to the fourth gate signal.

5. The pixel circuit of claim 4, further comprising:

a first-fifth switch element configured to apply a reference voltage to the first-third node in response to a fifth gate signal;

a second-fifth switch element configured to apply the reference voltage to the second-third node in response to the fifth gate signal; and a third-fifth switch element configured to apply the reference voltage to the third-third node in response to the fifth gate signal.

6. The pixel circuit of claim 5, further comprising:

a first-sixth switch element configured to apply the initialization voltage or an anode voltage to the first-fourth node in response to a sixth gate signal;

a second-sixth switch element configured to apply the initialization voltage or the anode voltage to the second-fourth node in response to the sixth gate signal; and a third-sixth switch element configured to apply the initialization voltage or the anode voltage to the third-fourth node in response to the sixth gate signal.

7. A display panel comprising:

an individual switch element configured to supply a pixel driving voltage to a first sub-pixel in response to a gate signal; and a shared switch element configured to supply the pixel driving voltage to second and third sub-pixels in response to the gate signal, wherein each of the individual switch element and the shared switch element includes a transistor having a channel width; and a channel width of the shared switch element is larger than a channel width of the individual switch element, wherein the first sub-pixel comprises:

a first driving element including a first electrode connected to a first-first node, a gate electrode connected to a first-second node, and a second electrode connected to a first-third node;

a first light emitting element connected to a first-fourth node and configured to be driven by a current from the first driving element;

a first-first capacitor connected between the first-second node and the first-third node or between the first-second node and the first-fourth node; and a first-second capacitor connected between a node configured to receive a constant voltage and the first-third node, wherein the second sub-pixel comprises:

a second driving element including a first electrode connected to a second-first node, a gate electrode connected to a second-second node, and a second electrode connected to a second-third node;

a second light emitting element connected to a second-fourth node and configured to be driven by a current from the second driving element;

a second-first capacitor connected between the second-second node and the second-third node or between the second-second node and the second-fourth node; and a second-second capacitor connected between a node configured to receive the constant voltage and the second-third node, wherein the third sub-pixel comprises:

a third driving element including a first electrode connected to a third-first node, a gate electrode connected to a third-second node, and a second electrode connected to a third-third node;

a third light emitting element connected to a third-fourth node and configured to be driven by a current from the third driving element;

a third-first capacitor connected between the third-second node and the third-third node or between the third-second node and the third-fourth node; and a third-second capacitor connected between a node configured to receive the constant voltage and the third-third node, wherein the shared switch element is connected to the second and third driving elements.

8. The display panel of claim 7, wherein the first sub-pixel is a first color sub-pixel, which emits light of a first wavelength;

the second sub-pixel is a second color sub-pixel, which emits light of a second wavelength; and the third sub-pixel is a third color sub-pixel, which emits light of a third wavelength.

9. The display panel of claim 8, wherein each of the second and third sub-pixels is configured to be driven by a greater current than the first sub-pixel.

10. The display panel of claim 8, wherein the first sub-pixel is a red sub-pixel, and one of the second and third sub-pixels is a green sub-pixel, and another one of the second and third sub-pixels is a blue sub-pixel.

11. The display panel of claim 8, wherein the second sub-pixel is a sub-pixel having smallest driving current among the first sub-pixel, the second sub-pixel, and the third sub-pixel, and the third sub-pixel is a sub-pixel having largest driving current among the first sub-pixel, the second sub-pixel, and the third sub-pixel.

12. The display panel of claim 8, wherein:

the first sub-pixel is a green sub-pixel;

the second sub-pixel is a red sub-pixel; and the third sub-pixel is a blue sub-pixel.

13. A display panel comprising:

a first transistor coupled between a pixel driving voltage terminal and only one first sub-pixel, the first transistor having a first channel width; and a second transistor coupled between the pixel driving voltage terminal and a second sub-pixel and between the pixel driving voltage terminal and a third sub-pixel, the second transistor having a second channel width that is larger than the first channel width, wherein the first sub-pixel comprises:

a first driving transistor including a first electrode connected to a first-first node, a gate electrode connected to a first-second node, and a second electrode connected to a first-third node;

a first light emitting diode connected to a first-fourth node and configured to be driven by a current from the first driving transistor;

a first-first capacitor connected between the first-second node and the first-third node or between the first-second node and the first-fourth node; and a first-second capacitor connected between a node configured to receive a constant voltage and the first-third node, wherein the second sub-pixel comprises:

a second driving transistor including a first electrode connected to a second-first node, a gate electrode connected to a second-second node, and a second electrode connected to a second-third node;

a second light emitting diode connected to a second-fourth node and configured to be driven by a current from the second driving transistor;

a second-first capacitor connected between the second-second node and the second-third node or between the second-second node and the second-fourth node; and a second-second capacitor connected between a node configured to receive the constant voltage and the second-third node, wherein the third sub-pixel comprises:

a third driving transistor including a first electrode connected to a third-first node, a gate electrode connected to a third-second node, and a second electrode connected to a third-third node;

a third light emitting diode connected to a third-fourth node and configured to be driven by a current from the third driving transistor;

a third-first capacitor connected between the third-second node and the third-third node or between the third-second node and the third-fourth node; and a third-second capacitor connected between a node configured to receive the constant voltage and the third-third node, wherein the second transistor is connected to the second and third driving transistors.

14. The display panel of claim 13, wherein the first sub-pixel, the second sub-pixel, and the third sub-pixel are configured to emit lights of three different colors, respectively.

* * * * *